United States Patent [19]

Fergason et al.

[11] Patent Number: 5,486,940
[45] Date of Patent: Jan. 23, 1996

[54] LIQUID CRYSTAL LIGHT POLARIZER AND METHOD

[75] Inventors: James L. Fergason, Atherton; Arthur L. Berman, San Jose, both of Calif.; Stephen D. Jacobs, Pittsford, N.Y.

[73] Assignee: Optical Shields, Inc., Menlo Park, Calif.

[21] Appl. No.: 447,915

[22] Filed: May 23, 1995

Related U.S. Application Data

[63] Continuation of Ser. No. 79,106, Jun. 17, 1993, abandoned.

[51] Int. Cl.⁶ .............................. G02F 1/1333; G02F 1/13
[52] U.S. Cl. ............................................... 359/74; 359/37
[58] Field of Search .................. 359/37, 63, 74, 359/95

[56] References Cited

U.S. PATENT DOCUMENTS

| | | | |
|---|---|---|---|
| 4,048,358 | 9/1977 | Shanks | 428/1 |
| 4,582,396 | 4/1986 | Bos et al. | 350/347 |
| 4,685,771 | 8/1987 | West et al. | 350/347 |
| 4,688,900 | 8/1987 | Doane et al. | 350/347 |
| 4,729,640 | 3/1988 | Sakata | 350/348 |
| 4,822,146 | 4/1989 | Yamanobe et al. | 350/348 |
| 5,235,443 | 8/1993 | Barnik et al. | 359/37 |
| 5,299,037 | 3/1994 | Sakata | 359/41 |
| 5,301,049 | 4/1994 | Katagiri et al. | 359/90 |

FOREIGN PATENT DOCUMENTS

| | | | |
|---|---|---|---|
| 61-86724 | 5/1986 | Japan | 359/95 |
| 62-194221 | 8/1987 | Japan | 359/95 |
| 63-262602 | 10/1988 | Japan | 359/37 |
| 9004805 | 5/1990 | WIPO . | |

OTHER PUBLICATIONS

Sid 93 Digest, pp. 669–672, "P–61: Retroreflecting Sheet Polarizer", Weber.
Sid 93 Digest, pp. 957–960, "44.2: Control of the LC Alignment Using A Stamped Morphology Method and its Application to LCDs", Lee et al.

*Primary Examiner*—William L. Sikes
*Assistant Examiner*—Charles Miller
*Attorney, Agent, or Firm*—Renner, Otto, Boisselle & Sklar

[57] ABSTRACT

A polarizer including liquid crystal material and a surface or surfaces for cooperating with the liquid crystal material to control polarization of light which is incident in a direction normal to the polarizer by at least one of refraction and total internal reflection of one polarization component of the light while transmitting the other polarization component substantially in the direction without refraction or total internal reflection, the surface or surfaces including plural grooves in cooperative relationship with the liquid crystal material.

38 Claims, 6 Drawing Sheets

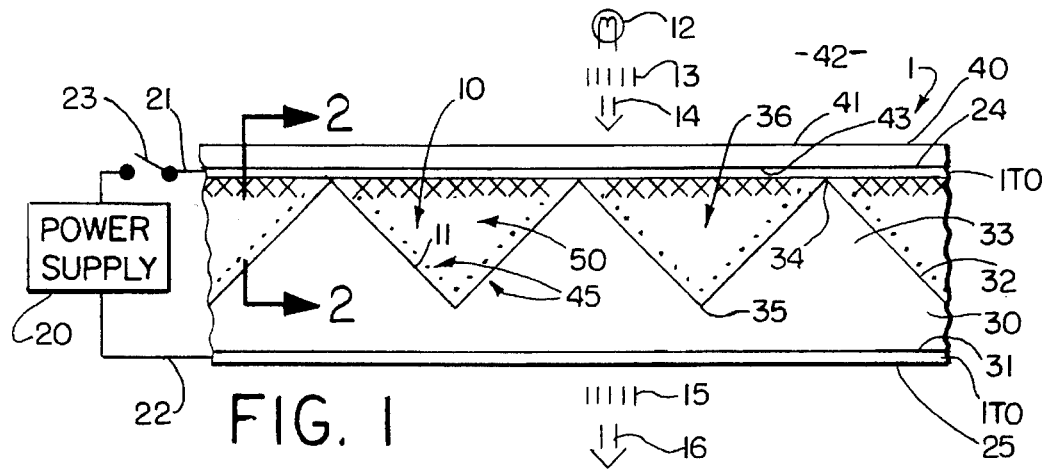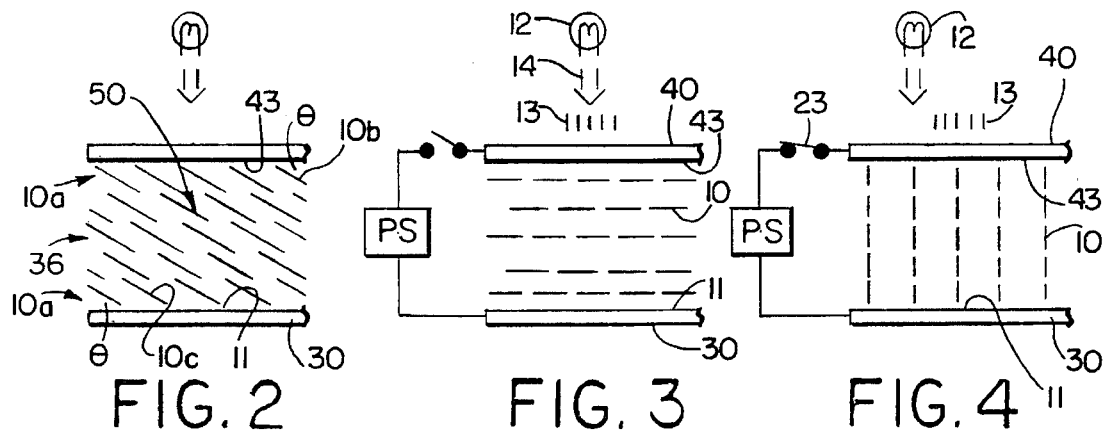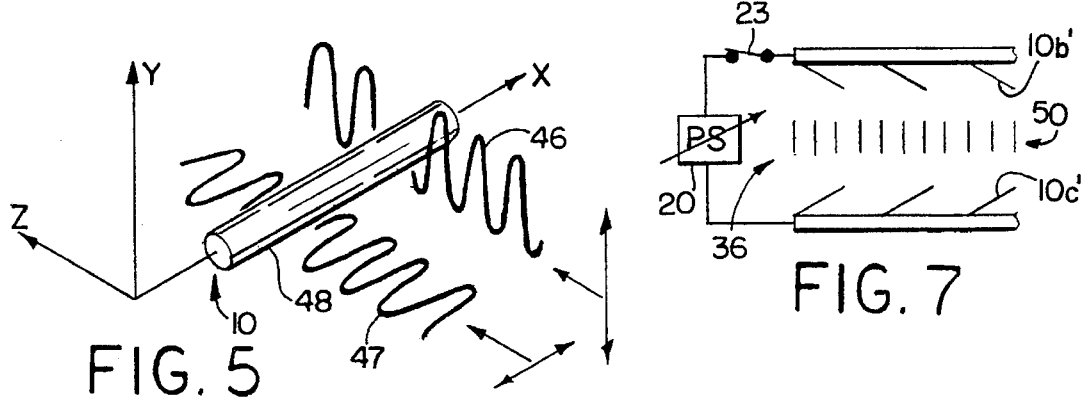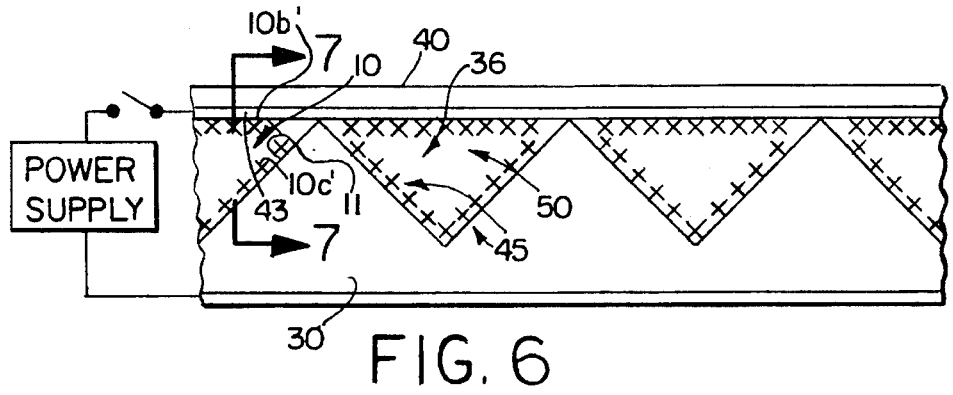

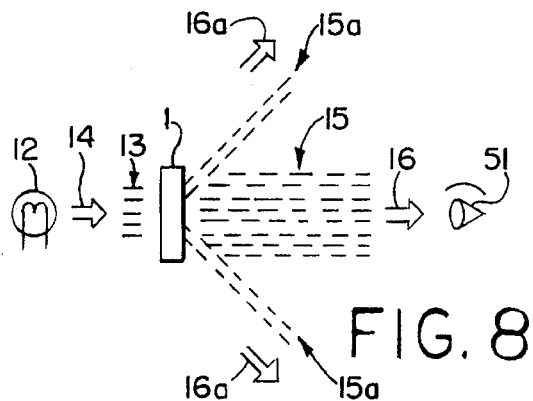
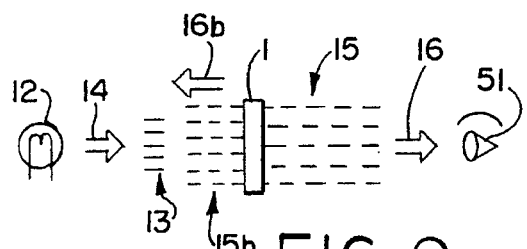
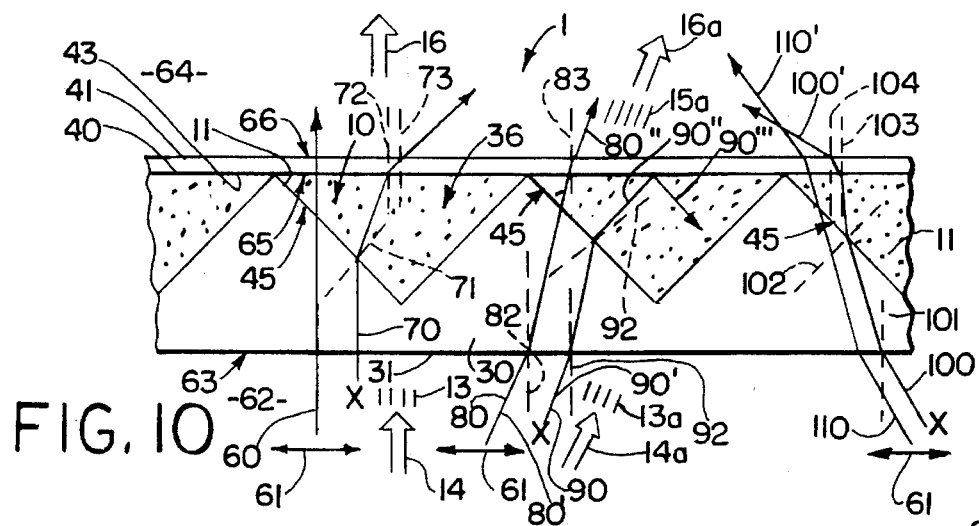
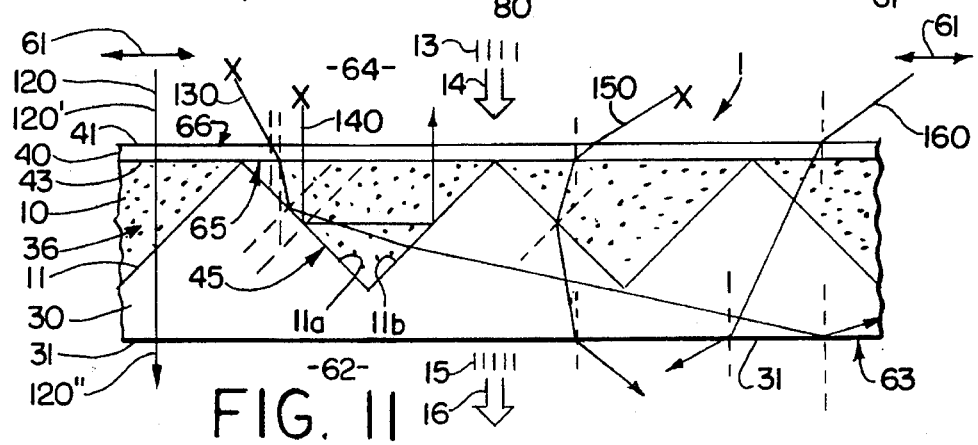
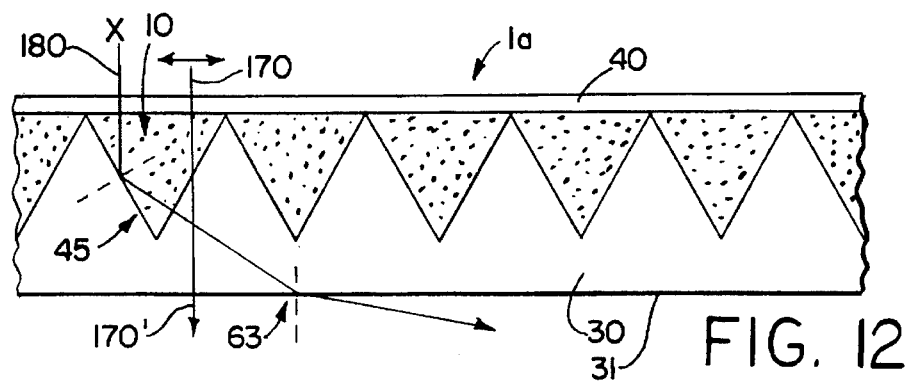

LIGHT POLARIZED PERPENDICULAR TO THE DIRECTOR IS TRANSMITTED WITHOUT ALTERATION.

LIGHT POLARIZED PARALLEL TO THE DIRECTOR IS SCATTERED.

LIQUID CRYSTAL LIGHT POLARIZER AND METHOD

This is a continuation of application Ser. No. 08/079,106 filed on Jun. 17, 1993 now abandoned.

TECHNICAL FIELD

The present invention relates generally to liquid crystal light polarizers and methods of polarizing light and of making a liquid crystal light polarizer, and, more particularly to controllable liquid crystal light polarizers, methods of controllably polarizing light and methods of making a controllable liquid crystal light polarizer.

BACKGROUND OF THE INVENTION

Light is formed of waves that vibrate in a transverse direction in the plane of the wave front. As light propagates in a direction, the wave front also propagates in that direction. Elliptical vibration is the most general case, and linear and circular vibrations are specific cases. The present invention relates to plane-polarized light (sometimes referred to as linear polarized light) wherein the wave vibrations are in a single plane. The plane polarized light may be used to create elliptically or circularly polarized light. The plane polarized light and/or circularly polarized light may be used in a variety of devices and methods, such as displays, shutters, optical (e.g., light) protection devices, special viewing devices, etc. Further description of polarized light and prior techniques for obtaining polarized light is provided in Fundamentals of Optics, (Jenkins and White, McGraw-Hill, Inc., New York, 1976), for example at chapters 24–26, the entire disclosure of which hereby is incorporated by reference.

Several methods for producing plane-polarized light described in Jenkins and White include reflection, transmission through a pile of plates, dichroism, double refraction, and scattering. Use of liquid crystal material to affect polarization and/or to polarize light is mentioned in U.S. Pat. Nos. 4,048,358, 4,688,900, and 4,685,771, and PCT patent application Publication No. WO 90/04805.

In the mentioned patents and published patent application polarization occurs as the light travels through the liquid crystal material and/or dye, e.g., pleochroic dye, contained in the liquid crystal material. However, due to uncontrolled scattering of at least some of the light, efficiency of polarization is reduced from the maximum.

A polarizer on demand device responds to a prescribed input or condition to polarize light or to reduce polarization of light, e.g., to be in a clear or substantially fully light transmissive state. As is described in the above PCT application Publication No. WO 90/04805, application of electric field reduces or stops polarization of light so that light is transmitted without regard to polarization direction; and removal of the field causes an increase in the polarization of transmitted light.

Reference is made to an article by M. F. Webber entitled "Retroreflecting Sheet Polarizer" published in the SID 93 Digest at page 669 on May 18, 1993. A reflecting sheet polarizer of a microprism array with thin film optical stacks is described in that paper. The device works generally according to Brewster's law so that s-polarized light, e.g., one polarized component—meaning plane polarized light, is reflected and p-polarized light, e.g., the other, i.e., relatively orthogonal, polarized component, is transmitted.

A stamped morphology technique for making a liquid crystal device is described in a paper entitled—Control of the LC Alignment Using a Stamped Morphology Method and its Application to LCDs" by Lee et al., SID 93 Digest at page 957, published May 18, 1993. This paper describes a method of aligning liquid crystal using microgrooves formed by a stamping process. Pretilt angle and azimuthal surface anchoring energy are described. Other exemplary techniques currently used for aligning liquid crystal material include rubbing of a surface and depositing of an evaporated coating. In one example of a rubbing technique, a surface intended to be in engagement with the liquid crystal material may be rubbed in a particular direction using a fabric material; often the surface first is coated with a material, such as polyvinyl alcohol or some other alignment material, which is rubbed. In the deposition technique, a material, such as a silicon oxide or silicon dioxide, is evaporated using known techniques and is deposited onto the surface that is to be engaged with the liquid crystal material; such deposition is carried out while the surface is maintained at a prescribed orientation relative to the evaporated material. Other techniques for aligning liquid crystal also may be used.

Several of the types of the liquid crystal materials currently known include those categorized as nematic, smectic, and cholesteric. Nematic liquid crystal tends to have a structural arrangement, alignment, or organization that tends to be linear, and the linear alignment thereof, or of the molecular or optical axis thereof often is referred to direction-wise with reference to the director of the nematic liquid crystal. Nematic liquid crystal tends to have directional alignment characteristics with respect to other nematic liquid crystal whereby the liquid crystal structure or directors tend to align in parallel, but nematic liquid crystal tends not to have a positional alignment requirement. In contrast, smectic liquid crystal, which has directional alignment characteristics, also tends to have positional alignment characteristics. Thus, smectic liquid crystal tends to orient in a layered arrangement or structure. Cholesteric liquid crystal material tends to have a helical or twisted structure.

Liquid crystal materials, such as nematic liquid crystal and smectic liquid crystal, often are anisotropic; for example, they may be optically anisotropic and/or electrically anisotropic. Nematic liquid crystal or smectic liquid crystal that has the characteristic of optical anisotropy, has an ordinary index of refraction experienced or measured when looking, traveling or propagating along the axis or the direction of the director of the liquid crystal and a different extraordinary index of refraction, which is experienced or measured when looking, travelling or propagating in a direction that is perpendicular to the axis or direction of the director for light that is vibrating in a plane that is congruent or coplanar with the liquid crystal axis or direction of the director. For light that is propagating in a direction perpendicular to the liquid crystal optical axis in a plane that is perpendicular to a plane that is congruent with the liquid crystal axis, the ordinary index of refraction characteristic of the liquid crystal is experienced.

SUMMARY OF THE INVENTION

According to one aspect of the invention, efficient polarization of light is obtained.

According to another aspect of the invention, a polarizer for polarizing light includes a liquid crystal material and a surface means for cooperating with the liquid crystal material to control polarization of light by at least one of refraction and total internal reflection of one polarization component of the light while transmitting the other polarization component substantially without refraction or total internal reflection.

According to an additional aspect of the invention, a method for polarizing light includes aligning liquid crystal relative to a surface or interface to provide a difference in index of refraction therebetween with respect to the polarization components of incident light to cause at least one of refraction and reflection of such light and less difference or a match of index of refraction for the other polarization component of the incident light to transmit that other polarization component with relatively less refraction or reflection, thereby to separate the second-mentioned polarization component from the first.

According to a further aspect, a method of making a polarizer includes providing a first medium having plural surfaces for refracting, reflecting or transmitting incident light, and placing a birefringent liquid crystal material in position with respect to the surfaces to cooperate with the surfaces controllably to refract or to reflect one polarization component of incident light and to transmit the other polarization component of the incident light substantially without refraction or reflection.

According to a further aspect, a method of making a polarizer includes providing a first birefringent medium having plural surfaces for refracting, reflecting or transmitting incident light, and placing a birefringent liquid crystal material in position with respect to the surfaces to cooperate with the surfaces controllably to refract or to reflect one polarization component of incident light and to transmit the other polarization component of the incident light substantially without refraction or reflection.

Still another aspect is to provide a cooperative relation between liquid crystal material and a surface to transmit toward a viewing direction one polarization component of incident light received from an incident direction and to separate the other polarization component of the incident light by refraction or reflection thereby to direct such other polarization component in a direction other than the viewing direction.

Still another aspect is to provide a cooperative relation between liquid crystal material and a surface to transmit toward a viewing direction one polarization component of incident light received from an incident direction and to separate the other polarization component of the incident light by refraction or reflection thereby to direct such other polarization component in a direction other than the viewing direction, and to use a selective input to the liquid crystal material to alter the index of refraction characteristics relative to at least some of the incident light, and, therefore, to alter the function of separating the respective polarization components.

Another aspect is to provide a polarizer including birefringent liquid crystal material having ordinary and extraordinary indices of refraction, means to cooperate optically with the liquid crystal material, the difference between the respective indices of refraction of the liquid crystal material and the index of refraction of the means to cooperate being respectively relatively smaller and relatively larger, and the liquid crystal material being alignable relative to the means to cooperate to transmit one polarization component of incident light substantially without affecting it and at least one of to refract and to cause total internal reflection of the other polarization component thereby to separate the polarization components.

Another aspect relates to a polarizer including first and second media, the first medium having a index of refraction, the second medium being birefringent and the difference between the index of refraction of the first medium and the respective indices of refraction of the second medium being respectively relatively small and relatively large, and the media being oriented relative to each other and positionable with respect to incident light to transmit one polarization component while separating therefrom the other polarization component.

Another aspect relates to a controllable polarizer including birefringent liquid crystal material, and means to cooperate with the liquid crystal material to transmit one polarization component of incident light and controllably to separate the other polarization component of incident light by reflection or refraction.

Another aspect relates to a method of polarizing light including aligning liquid crystal relative to a surface to provide a difference in index of refraction therebetween with respect to one polarization component of incident light to cause at least one of refraction and reflection of such light and less difference or a match of index of refraction for the other polarization component of incident light to transmit the other polarization component with relatively less refraction or reflection, thereby to separate the second quadrature component from the first mentioned quadrature component.

Yet a further aspect of the present invention relates to the use of a polarizer according to the invention in display devices, optical shutters, and optical protection devices.

Other aspects of the invention relate to the aforesaid aspects and wherein the second medium, substrate, etc., which with the birefringent liquid crystal material cooperates optically, also is birefringent and the optical characteristics and alignment of such medium, substrate, etc. and liquid crystal material are coordinated so that transmission/clear state and polarizing/scattering state occur in the opposite sense relative to the embodiment in which such medium, substrate, etc. is substantially isotropic.

These and other objects, features, aspects and advantages of the invention will become more apparent as the following description proceeds.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed.

Although the invention is shown and described with respect to certain embodiments, it is obvious that equivalents and modifications will occur to those skilled in the art upon the reading and understanding of the specification. The present invention includes all such equivalents and modifications, and is limited only by the scope of the claims.

BRIEF DESCRIPTION OF THE DRAWINGS

In the annexed drawings:

FIG. 1 is a schematic section view of a polarizer in accordance with the present invention;

FIG. 2 is a schematic section view of the polarizer of FIG. 1 looking generally in the direction of the arrows 2—2 of FIG. 1, but not taking into account the angular slope of the multi-faceted surfaces, and showing exemplary tilt angle directions for the liquid crystal material relative to the respective surfaces;

FIG. 3 is a section view similar to FIG. 2 schematically showing the approximate optically optimized parallel alignment of liquid crystal structure relative to the surfaces of the polarizer when an aligning input is not applied to the liquid crystal material;

FIG. 4 is a section view similar to FIG. 2 schematically showing the approximate alignment of liquid crystal structure relatively parallel to the light propagation direction and in relation to the surfaces of the polarizer when an aligning input is applied to the liquid crystal material;

FIG. 5 is a schematic graphical illustration of the alignment axis or director of a liquid crystal structural component and the relative orthogonal directions of the two polarization components of light propagating toward and through the liquid crystal;

FIG. 6 is a schematic section view of an alternate embodiment of the polarizer according to the invention, the liquid crystal alignment being parallel in the absence of a field input;

FIG. 7 is a schematic section view of the polarizer of FIG. 6 looking generally in the direction of the arrows 7—7 of FIG. 6, but not taking into account the angular slope of the multi-faceted surfaces, and showing exemplary tilt angle directions for the liquid crystal material relative to the respective surfaces;

FIG. 8 is a schematic illustration of a polarizer in accordance with the invention arranged between a light source and an area of view showing transmission of polarized light toward the area of view and directing of other light out of the area of view by refraction;

FIG. 9 is a schematic illustration of a polarizer in accordance with the invention arranged between a light source and an area of view showing transmission of polarized light toward the area of view and directing of other light out of the area of view by reflection;

FIG. 10 is a schematic illustration of a polarizer according to the invention, for example of the type shown in FIGS. 1 or 6, with exemplary light rays showing the direction of light propagation when the incident light is received from the multi-faceted side of the polarizer;

FIG. 11 is a schematic illustration of a polarizer according to the invention, for example of the type shown in FIGS. 1 or 6, with exemplary light rays showing the direction of light propagation when the incident light is received from the liquid crystal side of the polarizer;

FIG. 12 and 13 are schematic illustrations of polarizers in accordance with the invention wherein the angular relation between respective adjacent surfaces of the multi-faceted member is altered from the other described embodiments;

DESCRIPTION OF THE INVENTION

Figure 13:
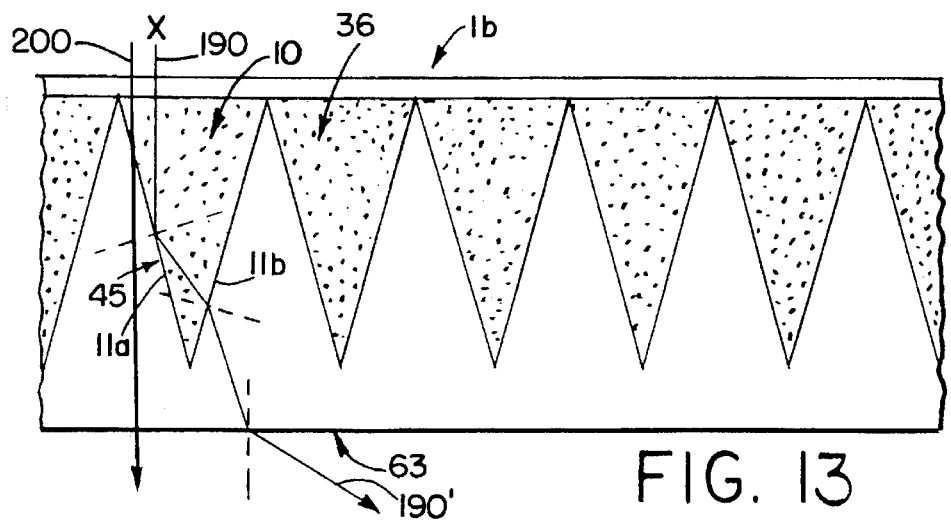

Referring in detail to the drawings, wherein like reference numerals designate like parts in the several figures, and initially to FIGS. 1–4, a polarizer in accordance with the present invention generally is designated 1. The polarizer 1 includes liquid crystal material 10 and surfaces 11 which cooperate with the liquid crystal material to reflect light, for example, by total internal reflection principle, to refract light, and/or to permit transmission of light without substantial reflection or refraction, and preferably without any reflection or refraction.

As it is used herein, the term light means electromagnetic energy in the visible spectrum as well as electromagnetic energy in the various infrared and ultraviolet ranges of the electromagnetic spectrum. Fundamentally, though, light is intended to mean that electromagnetic energy which the polarizer 1 of the invention will polarize and/or selectively will transmit or block transmission if already polarized.

In the embodiment illustrated in FIGS. 1–4, a light source 12, such as an artificial light source, sunlight, etc., provides a source of incident light 13, which propagates in an incident direction 14 toward the polarizer 1. Depending on the orientation of the liquid crystal material 10 relative to the surfaces 11 of the polarizer 1, the characteristics of output light 15, which is transmitted through the polarizer 1 and is directed in an output direction 16 can be controlled. For example, the output light 15 in the output direction 16 may be plane-polarized light. Alternatively, the light 15 may be unpolarized or random light. The polarizer 1 in a sense is a polarizer on demand device, e.g. the polarization characteristic can be determined as a function of a prescribed input.

Alignment of the liquid crystal material 10 relative to the surfaces 11 may be caused or determined by providing a prescribed input to the liquid crystal material. An exemplary prescribed input is an electric field. Another exemplary prescribed input may be a magnetic field or some other type of input.

A power supply 20 may be used to provide a source of electrical power to create an electric field across the liquid crystal material 10. In this regard, the power supply 20 is connected by electrical connections 21, 22 and a switch 23, which can be selectively opened or closed, to provide electrical energy across respective electrodes schematically and generally shown at 24, 25. As is described in greater detail below, when the switch 23 is open, preferably the liquid crystal material assumes a prescribed alignment, such as an alignment that is generally parallel to the surfaces 11 and perpendicular to the propagation direction of the incident light 13. When the switch 23 is closed, electric field is applied to the liquid crystal between the electrodes 24, 25 causing the liquid crystal structure to align generally parallel to the light propagation direction, parallel to the field, for example, in the manner illustrated schematically in FIG. 4. When magnetic field is applied, similar appropriate operation can be provided to effect control of alignment of the liquid crystal material 10 relative to the surfaces 11.

The power supply 20 may be an AC power supply, a DC power supply, or some other combination that is suitable for use in providing the appropriate input to the liquid crystal to obtain a particular alignment when desired. The power supply may be fixed or variable. For example, if the power supply 20 were variable, by varying the voltage of the electric field applied across the liquid crystal material, alignment of more or less liquid crystal with respect to the field could be controlled, and the extent that the liquid crystal is aligned and parallel with the field or is at some angle other than parallel with the field can be adjusted.

The polarizer 1 is formed of a base or substrate 30 that has planar or flat surface 31, but which could be another shape, if desired. The substrate 30 also includes a plurality of the surfaces 11 formed on the opposite side of the substrate relative to the planar surface 31. The surfaces 11 collectively form a multi-faceted surface 32 in which there are a plurality of raised areas 33 terminating in peaks or pinnacles 34 at the meeting of adjacent surfaces 11 relatively remote from the planar surface 31 and there also are a plurality of relatively low points 35 at the juncture between or of respective adjacent surfaces 11 relatively closer to the planar surface 31. The surface 32 thus forms between such relatively adjacent surfaces 11 spaces or troughs 36 in which liquid crystal material 10 is located. This arrangement of troughs in a sense causes the substrate to be an optical grating.

Preferably the material of which the substrate 30 is formed is optically isotropic, whereby the index of refraction remains constant regardless of the direction of propagation or vibration direction of light propagating therethrough; and preferably such material also is generally optically transmissive. At least the substrate 30 should not have substantially different optical properties, such as index of refraction, with respect to the vibration direction of light propagating in the usually expected direction therethrough, e.g., in a line generally including the incident direction 14 and the output direction 16. Exemplary materials of which the substrate 30 may be formed include a polymer or an epoxy that can be cured or cross-linked, for example by using heat, ultraviolet light, or some other means. The material may be glass, polymer, or some other transparent medium. An exemplary epoxy is that sold under the brand Norex, such material being curable by ultraviolet light induced cross-linking.

A cover 40 cooperates with the substrate 30 to form the one or more spaces 36 in which the liquid crystal material 11 is located. The cover 40 may be glass, or of some other material. For example, the cover 40 may be the same material as that of which the substrate 30 is formed. The cover 40 preferably is transparent or optically transmissive with respect to light with which the polarizer 1 is intended to function, as preferably is the material of which the substrate 30 is formed. In the illustrated embodiment the cover 40 is a flat planar material having an exterior surface 41 exposed to the external environment 42 and having an interior surface 43 generally facing the space(s) 36.

Two or more space(s) 36 may be completely separated from each other by the engagement of respective pinnacles 34 with the cover 40. However, such separation is not a requirement of the invention, and it is contemplated that at least in some instances there will be space between a respective pinnacle 34 and the interior surface 43 of the cover so that there is interconnection between adjacent spaces 36.

In one embodiment the spaces 36 are generally similar to elongate approximately triangularly-shape troughs or grooves along the direction of the substrate 30 looking generally into the plane of the paper in which FIG. 1 is drawn. However, the troughs may be somewhat irregular and may be other than truly straight or elongated, provided the desired optical effect to provide a polarized light output is obtained. For example, the pinnacle 34 and/or the point 35 may be somewhat rounded in shape, squared off in shape, or some other shape other than that formed by the intersection of two flat planes or two straight lines and some of each may be higher or lower than others, e.g., relative spacing from the substrate 31 or cover surface 43.

Also, although the cover 40 preferably is a flat material having flat coplanar surfaces 41, 43, the cover 40 may be of some other shape, such as one that is curved, is similarly formed relative to the shape of the substrate 30 with pinnacles and low points. In the latter case the pinnacles and low points of the cover may directly confront respective pinnacles 34 and low points 35 of the substrate 30 or be offset whereby a space 36 is formed by a respective raised portion 33 of the substrate 30 or cover 40 and a cooperating trough of the other member. There should be adequate space for the liquid crystal material to be located between the substrate 30 and cover 40.

Electrodes 24, 25 may be applied directly to the surfaces 31, 43 by conventional techniques. Exemplary electrode material is indium tin oxide (ITO); other electrode materials also may be used. The electrodes preferably are relatively thin so that they are transparent or substantially transparent to light with which the polarizer 1 functions.

The preferred liquid crystal material 11 used in the polarizer 1 is nematic liquid crystal. Preferably the nematic liquid crystal has an extraordinary index of refraction which is different from the index of refraction of the substrate 30; more preferably, the extraordinary index of refraction of the liquid crystal material 10 should be greater than the index of refraction of the substrate 30 presented to the liquid crystal material at the surfaces 11. Additionally, the liquid crystal material has an ordinary index of refraction that is more closely matched to the index of refraction of the substrate material 30 than is the extraordinary index of refraction. More preferably the ordinary index of refraction of the liquid crystal material 10 is the same as the index of refraction of the substrate 30 presented at the surfaces 11. The liquid crystal material preferably has a relatively high birefringence, meaning that the difference between the ordinary index of refraction and the extraordinary index of refraction is relatively large, for example, having a birefringence on the order from about 0.18 to about 0.28. Exemplary liquid crystal material that has relatively high birefringence is E7 or BL type materials such as BL-006, by E. Merck Company.

The liquid crystal material 10 also preferably has positive dielectric anisotropy. Therefore, in the presence of an electric field applied between the electrodes 24, 25, the liquid crystal structure will tend to align parallel to the field. When all or most of the liquid crystal material is aligned parallel to the field the ordinary index of refraction is experienced by light propagating through the liquid crystal material without regard to the vibration direction of the light. Since the liquid crystal material is selected such that the ordinary index of refraction and the index of refraction of the substrate 30 at the surface 11 are the same or substantially the same. In this case light will tend to be transmitted through the interface 45 between the liquid crystal material 10 and surfaces 11 substantially without refraction or reflection.

Nematic liquid crystal material tends to align according to the influence of a surface with which the liquid crystal material is engaged when in the absence of an external input, such as an electric field or a magnetic field. Moreover, the nematic liquid crystal material tends to align (alignment referred to herein meaning structural alignment or direction of the liquid crystal directors), generally in parallel so that the alignment of liquid crystal material that is located spaced away from a surface tends to be in the same direction as the alignment of the liquid crystal material adjacent the surface. Such parallel alignment is generally indicated and illustrated in FIGS. 1, 2 and 3.

The surfaces with which the liquid crystal material 10 is engaged may be, for example, formed of the actual material of which the substrate 30 and/or the cover 40 is constituted. Additionally and/or alternatively, such surfaces 11, 43 may be coated with materials, examples being the electrode 24; an alignment material, such as a polyvinyl alcohol, a polyimide, etc., for providing liquid crystal alignment or for some other purpose; a material for providing a particular index of refraction characteristic, such as a low or high index of refraction characteristic; etc. The use of such coatings is well known in the liquid crystal art. For convenience and brevity of the description below, the surfaces with which the liquid crystal material 10 is engaged and/or which cause alignment of the liquid crystal material will refer to the actual surfaces 11, 43 of the substrate 30 and cover 40, respectively, regardless of whether or not coatings are on such surfaces.

Insofar as optimized optical operation of the polarizer 1 is concerned, FIG. 3 illustrates the complete parallel alignment of liquid crystal structure with respect to the surfaces 11, 43 without regard to any tilt angle, surface anchoring, etc.; and FIG. 4 illustrates the optically optimized case showing liquid crystal structure aligned parallel to the applied field and other than parallel to the surfaces 11, 43 in the presence of an electric field without regard to surface anchoring, tilt angles, etc. which in fact do exist in the real case. Such real case in which there is surface anchoring of liquid crystal at the respective surfaces 11, 43 and tilt angles exist at the surfaces is illustrated in FIG. 2 and to an extent in FIG. 1.

As is seen in FIGS. 1 and 2, the liquid crystal material 10a adjacent a respective surface 11, 43 tends to anchor to the surface and to be aligned generally in parallel with the surface but with a small tilt angle, such as that designated θ.

Exemplary tilt angles may be from as low as near zero, for example, fractional degree, to about 30°; and a preferred range is on the order from about 5° to about 30° for the tilt angle θ. The tilt angle θ is represented in FIG. 2 between the director or structural alignment direction of liquid crystal structure 10b, for example, with such director pointing out of the plane of the surface 43. Although such director for purposes of the invention is considered as being generally in a direction parallel to the surface 43, it is slightly tilted according to the tilt angle θ and points to the lower right relative to the illustration in FIG. 2. Consistently, the director of the liquid crystal structure 10c adjacent the surface 11 is generally parallel to the surface 11 but is tilted slightly according to the tilt angle θ to point to the upper left relative to the illustration of FIG. 2. This convention of tilt angle is also shown in FIG. 1 wherein the "x" notations identify liquid crystal directors pointing into the plane of the paper and slightly downward relative to the drawing, such as that for the liquid crystal structures 10b, and the dots adjacent the surfaces 11 depict the directors pointing out of the plane of the paper and slightly upward relative to the drawing, such as for the liquid crystal structures 10c.

By providing such tilt angle relation of liquid crystal to respective surfaces and by having the tilt at the respective surfaces 11, 43 in opposite senses, i.e., toward the lower right or toward the upper left in the manner illustrated in FIG. 2 for the liquid crystal structures 10b, 10c, respectively, a substantially uniform and parallel alignment of liquid crystal structure through the space 36 is obtained in the manner depicted in FIG. 2, for example. Twist preferably is avoided. Therefore, the optical presentation of the liquid crystal material 10 to the light propagating through the liquid crystal material remains substantially constant relative to the particular index of refraction characteristic of the liquid crystal material and the vibration direction of the propagating light.

The parallel uniform alignment depicted in FIG. 2 also facilitates realigning of the liquid crystal material to an orientation such that some or all of the liquid crystal material aligns relative to an electric field applied across the electrodes 24, 25. As the electric field is applied, the liquid crystal material nearer the center 50 of the space 36 will first tend to align parallel to the field, and as the field is increased, the liquid crystal material closer to the surfaces 11, 43, will tend to align with respect to the field. This phenomenon of alignment as a function of the energy of the applied field is well known. For example, it takes more energy or voltage to realign the liquid crystal material which is adjacent to a surface and may be anchored to the surface than the amount of energy required to realign liquid crystal that is a distance away from the surface.

The surfaces 11, 43 preferably are treated to provide for the desired parallel alignment of liquid crystal structure in the manner illustrated in FIGS. 1–3. Thus, the liquid crystal structure or directors align generally in a direction that is parallel to the direction of the respective troughs between raised areas 33 of the substrate 30, and this is true both for the liquid crystal material which is engaged with, adjacent, and otherwise relatively near the respective surfaces 11, 43. Such direction generally is parallel to a direction that is perpendicular to the plane of the drawing of FIG. 1, for example. With respective troughs being linear and parallel with respect to each other, then, absent a field input, for example, the liquid crystal material tends to align structurally parallel in respective troughs forming respective spaces 36, and also the liquid crystal material in one trough will be generally parallel to the liquid crystal in adjacent troughs.

Various techniques may be used to achieve the desired alignment, e.g., by providing an alignment coating, such as rubbed polyvinyl alcohol, evaporated silicon oxide or silicon dioxide, or by forming microgrooves in the surfaces, such as by stamped morphology techniques.

Referring to, FIG. 3, an optically optimized parallel alignment of the liquid crystal 10 relative to the surfaces 11, 43 ignoring tilt angles is illustrated. When the liquid crystal is so oriented, one polarization component 46 (FIG. 5) of the incident light 13 from the source 12 travelling in the incident direction 14 will encounter the ordinary index of refraction of the liquid crystal material 10, and the other polarization component 47 (FIG. 5) will experience the extraordinary index of refraction.

As is seen in FIG. 5, a liquid crystal 10 structural component or director 48 is depicted in a three dimensional x, y, z coordinate system. The polarization component 46 of the light 13 propagates in the y direction and vibrates in a plane that is congruent with the x direction or axis. The polarization component 47 of the light 13 propagates in the y direction and vibrates in a plane that is perpendicular to the x direction or axis.

Continuing to refer to FIG. 3, the extraordinary index of refraction is different from the index of refraction of the surface 11 of the substrate 30. Therefore, that light which is incident on the interface 45 and which vibrates in a plane parallel and congruent to the liquid crystal axis, will experience the extraordinary index of refraction and will tend to refract or to be totally internally reflected at the interface. Such refraction or total internal reflection is described in greater detail below regarding operation of the polarizer 1. The polarization component of the incident light 13 which vibrates in a plane perpendicular to the liquid crystal axis experiences the ordinary index of refraction of liquid crystal material 10 and will tend to be transmitted through the interface 45 since the ordinary index of refraction and the index of refraction at the surface 11 are the same or the difference between the two is less than the difference between the extraordinary index of refraction and the index of refraction of the surface 11.

Referring to FIG. 4, when the switch 23 is closed to apply the electric field to the liquid crystal material 10, the liquid crystal aligns generally parallel to the field, and, therefore, parallel to the direction of light propagation therethrough. The light 13 from the source 12 tends to experience only the ordinary index of refraction of the liquid crystal material 10 and will not experience a difference in index of refraction at the interface 45 (or will experience a smaller difference than that between the extraordinary index of refraction and that of the surface 11). Therefore, refraction or reflection will not occur (or will be relatively minimal) at that interface and the light will tend to be transmitted through the interface.

Briefly referring to FIGS. 6 and 7, an alternate embodiment of polarizer 1' is illustrated. In the embodiment illustrated in FIGS. 6 and 7 the direction of alignment of liquid crystal material at respective surfaces 11, 43 is parallel to the surface, but the tilt angles are in the opposite sense of each other. Thus, the directors of liquid crystal 10b' and 10c' point generally in the same direction and are tilted toward each other. Examples of such alignment are described in U.S. Pat. No. 4,582,396, the entire disclosure of which is hereby incorporated by reference. To avoid a twist, such as a pi radian twist, in the liquid crystal material in the embodiment illustrated in FIGS. 6 and 7, preferably a holding voltage is applied to the liquid crystal material 10 to maintain the liquid crystal material near the center 50 of the space 36 aligned generally parallel with the field, thus in a sense separating the influence of one surface portion, e.g., proximate surface 11 or 43, of liquid crystal material on the opposite surface portion, e.g., proximate the other surface. Upon increasing the magnitude of the field, the liquid crystal material adjacent the surfaces will tend to align with the field without having to undergo a twist action. Upon reducing the field magnitude, the liquid crystal near the surfaces will tend to relax back to generally parallel orientation with respect to the surfaces 11, 43, but the voltage applied or some other technique, such as rms voltage, voltage mutliplexing, voltage cycling, etc. may be used to maintain the liquid crystal material near the center 50 aligned generally parallel to the field or in other words perpendicular to the surfaces 11, 43 to isolate the respective surface portions of liquid crystal material. Operation of the polarizer shown in FIGS. 6 and 7 would be substantially the same as operation of the polarizer 1 described above with respect to FIGS. 1–4.

As was mentioned above, a preferred liquid crystal material useful in the invention is nematic liquid crystal, and examples are presented above. The liquid crystal material may be other than nematic liquid crystal material provided that the liquid crystal is operationally nematic, i.e., it provides the desired characteristics both optically (birefringence, index of refraction) and physically in the sense of alignment and alignability characteristics. For example, the liquid crystal material should be alignable in one orientation to provide the desired index of refraction matching relative to the index of refraction of the substrate 30 at the interface 45, and the liquid crystal material also should be alignable in a way that provides the difference between the extraordinary index of refraction and the index of refraction of the surface 11 at the interface 45. The ability of the operationally nematic liquid crystal material to be aligned includes, for example, response to alignment inducing characteristics of the surface 11 or the surface 43, the characteristics of the liquid crystal material of tending to align parallel whereby the directors of the nematic liquid crystal material tend to remain parallel to each other, and the responsiveness of the liquid crystal material to align with respect to a field input, such as an electric field or a magnetic field or some other type of input. Various additives may be included in the liquid crystal material, various surface treatments may be applied to surfaces 11, 43, for example, and/or other means may be employed to enhance the alignment characteristics and/or to expedite alignment functions.

Smectic liquid crystal material also may be used in accordance with the invention. Since smectic liquid crystal material tends to have directional alignment characteristics somewhat similar to directional alignment of nematic liquid crystal, the smectic liquid crystal could be aligned relative to the surfaces 11, 43, for example. Such alignment may be obtained by heating the smectic liquid crystal material to a temperature exceeding the smectic to nematic transition temperature, allowing the liquid crystal material to align generally in the orientation of FIGS. 1–3 or FIGS. 6 and 7, and allowing the liquid crystal material to cool to a temperature below the nematic to smectic transition temperature. When using smectic liquid crystal material in the polarizer 1' of FIGS. 6 and 7, it would be desirable to provide a suitable field or other means to maintain the center 50 aligned generally parallel to the field and to the light propagating direction in order to maintain separation of the respective surfaces during the re-aligning of the liquid crystal material into an orientation that is generally parallel to the respective surfaces 11, 43. Subsequently, upon application of an input, such as a field input, especially an electric field, the liquid crystal structure will align parallel to the field in the manner described above. Due to the bulk characteristics of smectic liquid crystal, e.g. the layering thereof, the liquid crystal would tend to remain in the orientation caused by the field until reheated, for example, in the above described manner. Optical operation of a polarizer 1 or 1' using smectic liquid crystal material would be substantially the same as operation described above and below with respect to operationally nematic liquid crystal material.

Turning to FIGS. 8 and 9, operation of the polarizer 1 to produce polarized light is depicted schematically. Operation of polarizer 1' is substantially the same. An unpolarized light source 12 directs incident light 13 in the incident direction 14 toward the polarizer 1. The liquid crystal material in the polarizer is oriented parallel to the surfaces in the manner depicted in FIGS. 1, 2 and 3. Output light 15 directed in the output direction 16 toward the eye 51 of an observer, for example, is plane polarized light. The plane of polarization corresponds to the plane within which the polarization component 46 shown in FIG. 5 is vibrating, i.e., the plane of polarization is generally perpendicular to the axially direction (also referred to herein as the director) of the liquid crystal material 10 in the polarizer 1. Light which is the other polarization component, i.e., vibrating in a plane generally parallel to the axial direction of the liquid crystal material 10, such as the vibration direction of the polarization component 47 shown in FIG. 5, is directed out of or away from the output direction 16. For example, as is seen in FIG. 8, the light 15a, which is not plane polarized in the direction of the plane polarized light 15, is scattered by refraction in the direction 16a and is not seen by the eye 51. Alternatively, or additionally, as is seen in FIG. 9, the specified polarization component which experiences the extraordinary index of refraction of the liquid crystal material 10 may be reflected as reflected light 15b in a direction generally indicated at 16b. Such reflection may be caused by total internal reflection occurring in the polarizer 1. Whether the polarization component is refracted or is reflected will be a function of the index of refraction characteristics or values of the liquid crystal material, surface 11 and substrate 30, cover 40 and its surfaces; a function of the angular orientation of respective surfaces 11 (or surface 43) relative to the light incident thereon; and/or a function of the wavelength of the light.

Referring to FIG. 10 the polarizer 1 is shown schematically with respect to the direction of propagation of several light beams or light rays to demonstrate exemplary operation when the incident light impinges initially on the planar surface 31 of the polarizer substrate 30. The incident light 13 is unpolarized light received from a source, such as the source 12. Light ray 60 represents one polarization component of the incident light 13 vibrating in a direction or plane which is generally perpendicular to the director or axis of structural alignment of the liquid crystal material 10. Arrows 61 in the several figures designate light rays, beams or polarization components of the light which vibrate in such direction perpendicular to the directors of the liquid crystal material so that those light rays will experience the ordinary index of refraction of the liquid crystal material and not the extraordinary index of refractions. The liquid crystal material 10 is represented by a series of dots in the spaces 36 indicating an end view looking along respective liquid crystal axes or directors. In the examples described below it is assumed that the indices of refraction of the substrate 30 and cover 40 are the same and also are the same as the ordinary index of refraction of the liquid crystal material 10; that the extraordinary index of refraction of the liquid crystal material is larger than the ordinary index of refraction; and that the polarizer 1 is located in air which has an index of refraction less than that of the substrate 30 or cover 40 interfacing therewith. These assumptions are the perfect case and in the real case it is possible that there may be some variations in the respective indices of refraction values and relationships described.

The ray 60 is incident on surface 31 in a direction normal to the plane of the surface 31 so that there is no refraction at the interface between the surface 31 and the environment or medium 62, such as air, or other environment forming an interface 63 with the surface 31. The ray 60 passes through the interface 45 between the surface 11 and the liquid crystal 10 without refraction since the ordinary index of refraction, which is experienced by such ray in view of the direction of vibration thereof, is matched to the index of refraction of the surface 11. Furthermore, the ray 60 passes through the cover 40 and exits the cover to the external environment 64, such as air or other environmental medium, for viewing, subsequent use, etc. There is no refraction of the ray 60 at the interface 65 between the liquid crystal material 10 and the cover surface 43 both because the ray 60 impinges on the interface 65 in a direction that is generally normal to the plane thereof and because preferably the ordinary index of refraction of the liquid crystal material 10 is the same as the index of refraction of the cover 40. There also is no refraction at the interface 66 between the cover surface 41 and the external environment 64 because the ray 60 preferably is propagating in a direction that is normal to the interface 66.

Light ray or polarization component 70 also enters the polarizer 1 at the interface 63 in a direction normal to the interface, but ray 70 is vibrating in a plane that is generally parallel to the alignment axis or directors of the liquid crystal material 10 or, more specifically, a plane that is congruent with a director and the light propagating direction. The letter 'x' in the several figures represent such vibration characteristic for the associated light ray, beam or polarization component of the light. (For shorthand, such light will be referred to as vibrating in a direction or in a plane that has a direction without referring to the congruency relationships required to define such plane.) Therefore, when the ray 70 impinges on the interface 45 it encounters the extraordinary index of refraction of the liquid crystal material 10, which is different from, preferably greater than, the index of refraction of the substrate 30 and surface 11. Ray 70 will bend toward the normal 71, which is drawn at the interface 45 where the ray 70 passes through the interface. Such refraction tends to direct the ray 70 out of the output light direction 16. As the ray 70 encounters the interface 65 between the liquid crystal material 10 and the cover surface 43, since the index of refraction of the cover 40 preferably is the same as the index of refraction of the substrate 30 and in any event preferably is less than the extraordinary index of refraction of the liquid crystal material 10, the ray 70 will bend away from the normal shown at 72. This takes the ray 70 further away from the output direction 16. Still further, when the ray 70 passes through the interface 66 of the cover surface 41 with the external environment 64, assuming the external environment 64 has a smaller index of refraction than the index of refraction of the cover 40, the ray 70 will be bent away from the normal 73 and, thus, even further away from the output direction 16. The light rays 60 and 70 represent the two statistical cases for incident unpolarized light from a single direction incident on the polarizer 1 from the substrate side, the direction of incidence being normal (perpendicular) to the surface 31 of the polarizer. The polarizer functions to transmit light polarization components 60 to provide plane polarized output light 15 in the output direction 16 while separating from the output direction 16 polarization components 70. Since light is not absorbed by the polarizer 1, problems of heating and heat dissipation are avoided, and light of the polarization component 60 is not lost due to absorption other than minimal absorption that may occur by light transmitting through an imperfectly transmissive medium. Operation of the polarizer 1 is efficient and effective.

Two polarization components of incident light 13a are shown impinging on the surface 31 of the polarizer 1 from an incident direction 14a at an angle that is not perpendicular to the surface 31. One of those rays 80 represents a polarization component of the incident light 13a which is vibrating in the direction of the arrow 61 perpendicular to the liquid crystal directors so that the ray 80 experiences the ordinary index of refraction of the liquid crystal material 10 when propagating therethrough. The incident portion 80', i.e., that portion of the ray 80 which impinges on the interface 63, is incident on the interface 63 at an acute angle with respect to the normal 82. The ray 80 bends toward the normal 82 when propagating through the interface 63. No refraction occurs at the interface 45 because the ordinary index of refraction of the liquid crystal material 10 and the index of refraction of the medium 30 are the same. Also, no refraction occurs when the ray 80 propagates through the interface 65 of the liquid crystal material 10 with the cover surface 43. However, when the ray 80 exits the cover surface 41 as output light 80", the ray bends at the interface 66 in a direction away from the normal 83. The direction of the output ray portion 80" will be parallel to the direction of the incident ray 80', particularly when the index of refraction of the substrate 30, the index of refraction of the cover 40, and the ordinary index of refraction of the liquid crystal material 10 are the same. However, the output ray 80" may be laterally shifted due to refraction that occurs at the interfaces 63 and 66. The direction of the output ray 80" may be different than the direction of the incident ray 80' if steps are taken to changes various indices of refraction of the material(s) through which the ray 80 propagates while passing through the polarizer 1. For example, if a material having an index of refraction different from the index of refraction of the substrate 30 or cover 40 were applied as a coating to any of the surfaces 31, 11, 43 or 41, a change in direction may occur. Also, if the ordinary index of refraction of the liquid crystal material were different from the index of refraction of the surface 11 and/or the surface 43 of the cover 40, a change in direction may occur. Preferably, though, the ordinary index of refraction of the liquid crystal material is matched as closely as possible to the index of refraction of the medium 30 and the cover 40.

A different my 90 of the incident light 13a in the incident direction 14a represents a different polarization component of the light 13a vibrating in a direction represented by the letter "x" perpendicular to the axial direction or directors of the liquid crystal material 10. The incident portion 90', i.e., that portion of the ray 90 incident on the interface 63, is parallel to the incident portion of the ray 80', impinges on the interface 63 at an angle with respect to the normal 92, and refracts at the interface 63 bending toward normal 92 when entering the substrate 30. Since the extraordinary index of refraction of the liquid crystal material 10 preferably is larger than the index of refraction of the surface 11, the ray 90 will bend toward the normal 92 at the interface 45 when propagating into the liquid crystal material 10. Thus, the ray 90 is bent in a direction away from the direction of the output ray 80" It is possible that the refracted ray 90" in the liquid crystal material 10 will encounter further refraction at the interface 43 and again at the interface 41 and be transmitted out through the cover 40 in a direction different from the direction 80" in a manner similar to the refraction described above with respect to the ray 70. However, it is possible that total reflection (also sometimes referred to as total internal reflection) may occur when the ray 90" impinges on the interface 65, whereupon such ray 90" is reflected as ray 90''' completely out of the direction, indeed nearly in the opposite direction, of the ray 80'. Total reflection occurs according to Snell's Law as a function of the extraordinary index of refraction of the liquid crystal material 10, the index of refraction of the cover 40 at the surface 43, the wavelength of the light, and the angle at which the light ray 90" impinges on the interface 65, as is known. (See, for example, Chapter 2 in the above-referenced Jenkins and White text.)

From the above description, then, it will be appreciated that the output light 15a propagating in the direction 16a will be plane polarized light, the direction of vibration of which is parallel to the plane of the drawing of FIG. 10 and, thus, perpendicular to the axial direction of the liquid crystal material 10. The other incident light 13a which is not vibrating in the same plane as the output light 15a will be directed out of the output light direction 16a by refraction and/or reflection as was described.

An example of another light ray 100, which is vibrating in a plane that is parallel to the direction of the axis of the liquid crystal material 10 also is shown in FIG. 10. The ray 100 is incident on the polarizer 1 at an angle other than 90° with respect to the plane of the surface 31. Therefore, the ray 100 refracts at the interface 63 and bends toward the normal 101. The ray 100 also refracts at the interface 45, bending away from the normal 102 because the extraordinary index of refraction of the liquid crystal material 10 is larger than the index of refraction of the surface 11. The ray 100 refracts at the interfaces 65 and 66, bending away from the normals 103, 104 and exits the cover 40 as output light 100'. A comparative ray 110 that is incident on the surface 31 in a direction parallel to the ray 100 but is vibrating in a plane that is perpendicular to the axis of the liquid crystal material 10, also is shown. The ray 110 refracts at the interface 63 and at the interface 66, but does not refract at the interface 45 or the interface 65, as was described above with respect to the ray 80, for example. The output direction of the output ray 110' is different from the output direction of the ray 100', and, therefore, separation of the polarization components of the incident light 100, 110, for example, is obtained.

The foregoing description is with respect to the polarizer 1 in which the liquid crystal material 10 is aligned generally parallel to the surfaces 11, 43. However, in the event an electric field is applied or some other means is provided to align the liquid crystal material so that it assumes an orientation of the axes, structure or directors that are generally parallel to the direction of light propagation through the liquid crystal material, for example, in the manner illustrated in FIG. 4, then the light rays 70, 90 and 100 will not refract at the interfaces 45, 65, or in any event will refract the same as that which occurs with respect to the light rays 60, 80 and 110. Therefore, the output direction of the output light will not vary with respect to the direction of vibration of the respective polarization components thereof, and the polarization characteristics, whether polarized or unpolarized, will be substantially the same as the polarization characteristics of the light that is incident on the polarizer 1.

Polarizer 1 is shown in FIG. 11 oriented to receive input light 13 at the liquid crystal side of the polarizer, i.e., being received through the cover 40, compared to the illustration in FIG. 10 where the incident light is received at the substrate side of the polarizer. Operation of the polarizer 1 shown in FIG. 11 is substantially the same as operation of the polarizer shown in FIG. 10 and will be summarized below. Ray 120 represents a polarization component of incident light that is vibrating in a plane perpendicular to the axis of the liquid crystal material 10. Ray 120 experiences only the ordinary index of refraction of the liquid crystal material 10 and, therefore, does not experience any change in index of refraction as it propagates through the polarizer 1. Therefore, the direction of the incident ray portion 120' will be the same as the direction of the output ray portion 120", and there will be no lateral shift between the incident and output ray portions since ray 120 propagates in a direction normal to the surfaces 31, 41.

Light ray 130 represents a polarization component of incident light vibrating in a plane generally parallel to the axis of the liquid crystal material and incident on the interface in other than perpendicular relation. The ray 130 refracts at the interface 66 and at the interface 65. The ray 130 encounters total internal reflection at the interface 45 at surface 11a and refraction at the interface 45 and surface 11b. The ray 130 continues to propagate toward the surface 31 where it again is total internally reflected at the interface 63 and is quite out of the output light direction in the field of view of the polarizer.

Another example of separating from unpolarized incident light, light that vibrates in a plane that is parallel to the direction of the liquid crystal axis, is represented by light ray 140. Such light ray is incident on the polarizer 1 in a direction that is substantially perpendicular to the cover 40. The ray 140 is totally internally reflected at the interface 45 between the liquid crystal material 10 and surface 11a and again is totally internally reflected at the interface 45 between the liquid crystal material 10 and the surface 11b. To obtain both total internal reflection occurrences it is necessary that the angular relation between the surfaces 11a and 11b, the extraordinary index of refraction of the liquid crystal material 10 and the index of refraction of the substrate 30, and the incident angles of the light ray 140 on the interfaces 45 meet the conditions of Snell's Law.

Ray 150 represents another example of incident light having a polarization component that vibrates in a direction parallel to the axis of the liquid crystal material 10. The light ray 150 refracts at the interfaces 66, 65, 45, and 63 as it propagates through the polarizer 1. Still another example is depicted by light ray 160, which represents a polarization component of incident light vibrating in a direction perpendicular to the axis of the liquid crystal material 10. Light ray 160 refracts at the interface 66 and at the interface 63 since the index of refraction of the environments 64, 62 are different from the index of refraction of the cover 40 and substrate 30. However, there is no refraction at the interfaces 65 and 45, as was described above, for example, with respect to the rays 80 and 110 in FIG. 10.

FIGS. 12 and 13 depict polarizers 1a, 1b, which are substantially the same as polarizer 1 described above. The angular relationship of respectively adjacent surfaces 11 in polarizers 1a, 1b are different from those shown in the other drawings. However, operation of the polarizers 1a, 1b is substantially the same as is described above with respect to the polarizer 1. For example, light ray 170 represents a polarization component of incident light that is vibrating in a plane that is perpendicular to the axis of the liquid crystal material 10. Light ray 170 is transmitted through the polarizer 1a without refraction or reflection and is emitted as plane polarized light 170'. In contrast, light ray 180 represents a polarization component of the incident light that is vibrating in the direction that is parallel to the direction of the axis of the liquid crystal material 10. Light ray 180 encounters total internal reflection at the interface 45 and refraction at the interface 63 thereby to become separated from the plane polarized light and directed out of the viewing direction of the polarizer 1a. In polarizer 1b an exemplary light ray 190, which is representing a polarization component of incident light that is vibrating in a direction parallel to the axes of the liquid crystal material 10 in the spaces 36, is totally internally reflected at the interface 45 with the surface 11a, is refracted at the interface 45 with the surface 11b, and is refracted at the interface 63. Thus, output light ray 190' is in a direction quite different from the direction of output light ray 200, which represents a polarization component of incident light that is vibrating in a plane perpendicular to the liquid crystal axis.

Figure 14:
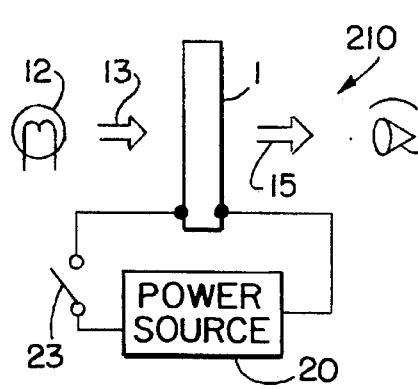
FIG. 14 is a schematic illustration of an optical protection device using a polarizer in accordance with the invention.

FIG. 14 shows a device 210 that provides selective polarization of light, for example, for use as an optical protection device or other device, apparatus or system. The device 210 may be electronic glasses, such as electronic sunglasses. Another example of the device 210 is a light source for a projection display system. The device 210 may be used to reduce the amount of light transmitted for virtually any purpose. The device 210 includes a polarizer 1 and a power source 20. Closure of a switch 23 provides power to the polarizer 1 causing it to transmit substantially all light 13 received from the light source 12. Opening the switch 23 allows the liquid crystal material in the polarizer 1 to relax or to realign to a direction parallel to the surfaces in the polarizer thereby to transmit plane polarized light 15 toward a viewing direction, such as an eye 51 of an individual, whereas light that is not of the desired polarization component will be refracted or reflected out of the field of view of the eye 51.

Figure 15:
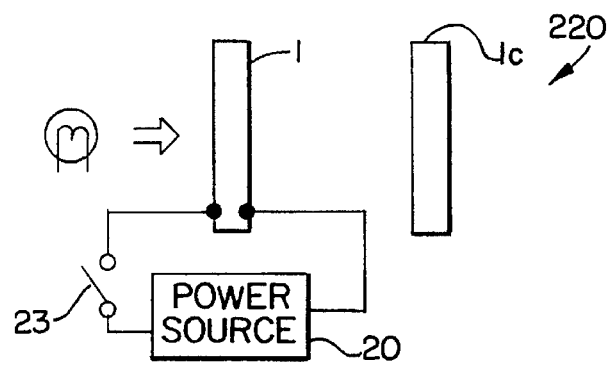
FIG. 15 is a schematic illustration of a light shutter in accordance with the invention using two polarizers.

An optical shutter 220 is shown in FIG. 15. The optical shutter 220 includes the optical device 210, for example, plus a further polarizer 1c (also sometimes referred to as an analyzer). The further polarizer 1c may be, for example, another polarizer similar to the polarizer 1 or it may be a conventional polarizer. The polarizer 1c may be oriented such that the transmissive axis thereof is partly or fully crossed relative to the plane of polarization of the light transmitted by the polarizer 1. When the polarizer 1 is transmitting only plane polarized light, then, the crossed polarizer 1c will block the light received from the polarizer 1 from being transmitted. However, when the polarizer 1 is not polarizing, then light will be transmitted through the polarizer 1c. The intensity of the light transmitted through the polarizer 1c will be a function of whether or not the polarizer 1 is polarizing light and if polarizing, the extent to which such polarizer 1 is polarizing the light. Therefore, by varying the voltage applied to the polarizer 1, the extent that the light received by the polarizer 1c is only plane polarized or contains light that is not plane polarized in the specified direction of polarization of the polarizer 1, can be varied.

Figure 16:
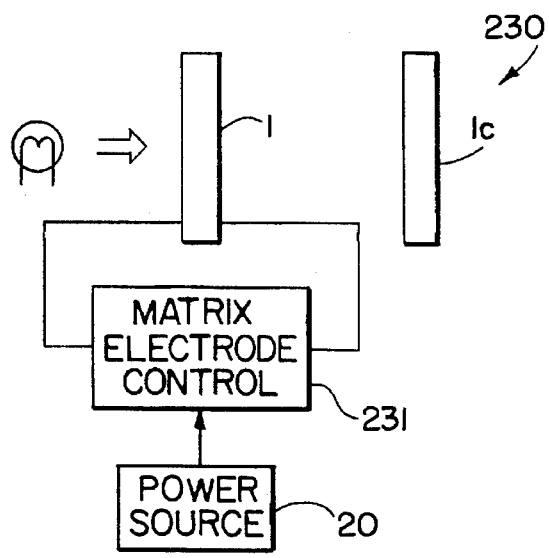
FIG. 16 is a schematic illustration of a display using at least one polarizer in accordance with the invention provided with a matrix arrangement of electrodes.
Figure 17:
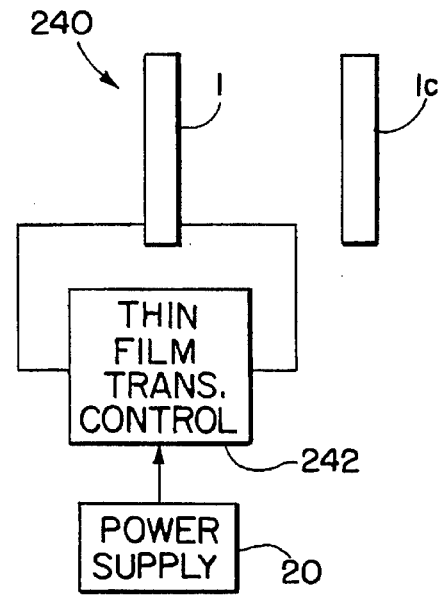
FIG. 17 is a schematic illustration of a further display using at least one polarizer in accordance with the invention operated by a plurality of thin film transistors and appropriate thin film transistor control circuitry.

FIGS. 16 and 17 illustrate schematically respective displays 230, 240 using polarizer 1. Each display includes both the polarizer 1 and a further polarizer 1c, which may be a fixed polarizer or a variable polarizer, such as the polarizer 1. If a variable polarizer, the polarizer 1c may be controlled by appropriate circuitry, electrodes, thin film transistors, etc. The polarizer 1c preferably is crossed or partially crossed relative to the polarizer 1. The display 230 includes a power source 20 that supplies electrical power to a matrix electrode control 231. The electrodes of the polarizer 1 may be arranged in a grid-like pattern or in some other pattern that provides desired areas of the polarizer 1 with appropriate electric field. Such matrix driving arrangements are well known, a common example being a seven segment display used in typical liquid crystal display devices. The matrix electric control 231 may be a conventional device, such as a device that selectively applies voltage across respective pairs of electrodes to align liquid crystal located therebetween thereby to create selective areas of polarized light and other areas that are not polarized. By arranging the analyzer (polarizer) 1c in crossed relation to the polarizer 1, then, images can be created. For example, light that is not polarized by the polarizer 1 will be transmitted by the analyzer 1c, whereas plane polarized light from the polarizer 1 may be blocked by the analyzer 1c.

The display 240 is similar to the display 230 except that the devices used to apply electric field to the liquid crystal material include thin film transistor devices which are controlled by a conventional thin film transistor control circuit 241 that selectively applies voltage derived from the power supply 20 across respective areas of the polarizer 1. An analyzer (polarizer) 1c cooperates with the polarizer 1 to transmit or to block light as a function of whether or not the light is polarized, thereby to create an image.

Either of the displays 230, 240 may be used for direct viewing, for projection display purposes, and/or for other display purposes.

Figure 18:
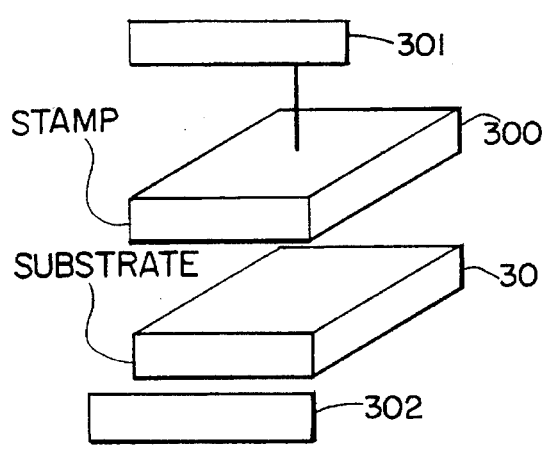
FIG. 18 is a schematic illustration of a process for manufacturing a polarizer in accordance with the present invention using stamped morphology technique.

In FIG. 18 a method of making a polarizer substrate 30 is depicted. The method includes providing a substrate of suitable material and using stamped morphology processing forming plural raised and recessed areas in the substrate to create the multi-faceted surface 32 having the surfaces 11. The substrate 30 material may be a polymer, epoxy, resin, or some other material that can be stamped by a tool 300. The substrate also should be able to harden or otherwise to be cured to a sufficiently fixed shape to provide the operative properties described above. For example the substrate may be a material that is cured by cross linking in response to application of thermal energy, ultraviolet light (radiation), etc. The tool 300 may be a metal or other material which has plural raised and recessed areas formed thereon, e.g., to define respective raised and recessed parts of the substrate 30, including the illustrated troughs. Additionally, the surface of the tool 300 which confronts the substrate 30 may have plural lands, e.g., relatively flat portions perpendicular to the light transmission direction, formed therein which run generally parallel to the troughs of the tool. Such lands will be transferred to the substrate as microgrooves in the surfaces 11 to provide a function of aligning the liquid crystal material generally in parallel with the direction of the microgrooves.

The tool 300 may be mounted on a machine 301, and the substrate 30 may be placed on a base 302 of the machine in alignment with respect to the tool 300. The tool is brought into engagement with the substrate to form the desired surface configuration and then is removed from the substrate. The substrate is appropriately cured to complete the process of making the substrate. Thereafter, the liquid crystal material 10 is applied in the spaces 36 and the cover 40 is assembled relative to the substrate 30. Appropriate sealing is provided in conventional fashion, for example, to prevent liquid crystal from leaking out from the spaces 36.

Figure 19:
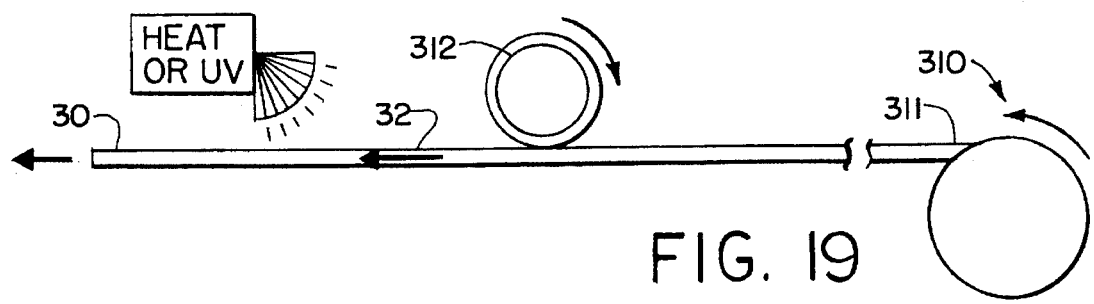
FIG. 19 is a schematic illustration of a method and apparatus for making a polarizer according to the invention using curable substrate material and a continuous roller process.

A continuous method for making the substrate 30 is illustrated in FIG. 19. A supply 310 of substrate material 311, such as an uncured polymer or plastic material is provided. The substrate material 311 is shown as a roll in FIG. 19, but the supply may be an elongate sheet or may be provided from some other source, such as from an extrusion die that provides a continuous extrusion function to make the substrate material. The substrate material 311 is moved past a roller stamping tool 312 which forms the desired multi-faceted surface 32 therein. The tool 312 may include a plurality of circumferentially spaced raised and recessed surfaces which form the raised and recessed portions of the surface 32 of the substrate 30; and the tool 312 also may include microgrooves as described above with respect to the tool 300. After the tool 312 forms the desired configuration of the surface 32, the substrate material 311 may be cured by heat, ultraviolet light, etc. to form the substrate 30. The substrate then may be assembled with the liquid crystal material 10 and cover 40 as was described above with respect to FIG. 18.

Figure 20:
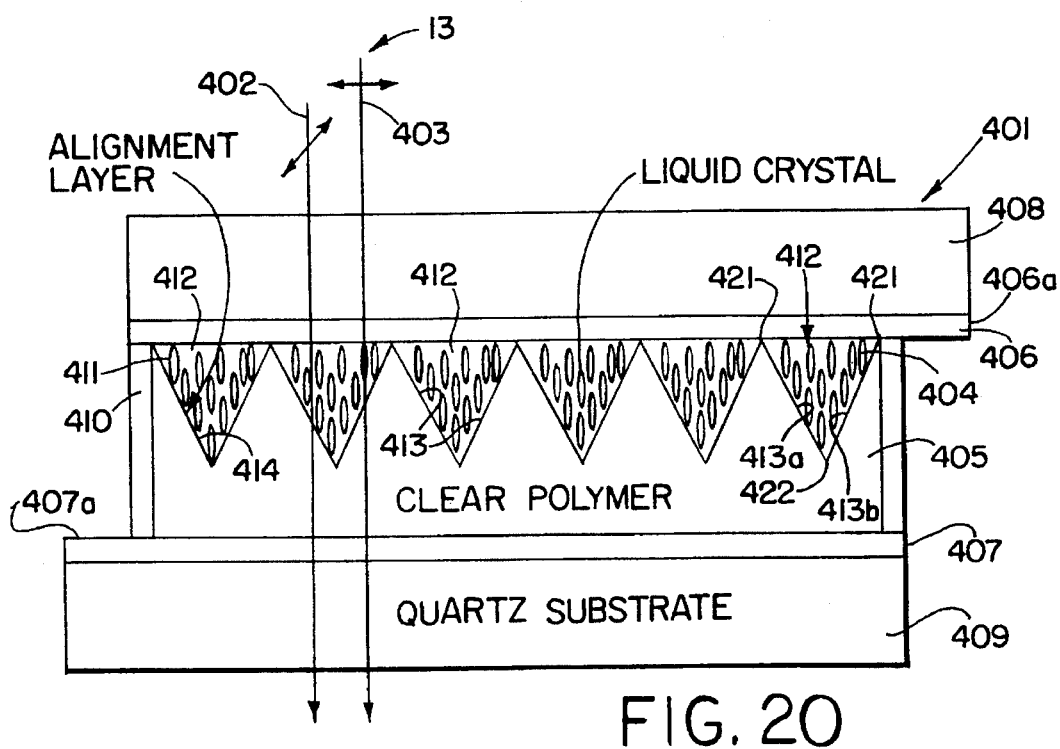
FIG. 20 is a schematic side elevation view of a grating based scattering polarizer according to the invention in the voltage on or clear state, the polarizer having a schematically representative number of grooves therein.

Turning to FIGS. 20–23, an example of a grating based scattering polarizer 401 similar to the polarizer 1, for example, described above is shown. The polarizer 401 is shown in FIG. 20 in the clear state meaning that incident light 13 is transmitted without regard to the polarization direction of the light. In the illustrated embodiment, such clear state is caused by applying the appropriate electric voltage, more specifically an electric field, across the liquid crystal material in the polarizer 401 and/or by other technique that results in the index of refraction of the liquid crystal material for all directions of polarization of the incident light being matched to the index of refraction of the substrate. Thus, light ray 402 represents plane polarized light in which the direction of vibration is out of the plane of the paper on which the drawing of FIG. 20 is presented, and light ray 403 represents plane polarized light, which is vibrating in a plane that is parallel to the plane of the paper on which the drawing of FIG. 20 is presented. It will be seen that both light rays 402 and 403 are transmitted through the polarizer 401 without regard to the polarization direction of the light.

The polarizer 401 includes liquid crystal material 404, for example of the type described above, a substrate 405, a pair of electrodes 406, 407, which may be coupled to an electrical source to apply an appropriate electrical input to the liquid crystal material, such input preferably being an electric field, and a pair of quartz plates 408, 409. The plate 408 is analogous to the cover 40 of the polarizer 1, and the plate 409 provides protection for the electrode 407. A perimeter seal 4 10 of conventional material is provided to retain the liquid crystal material 404 within the spaces 411, as is conventional in liquid crystal cells and other devices in which it is desired to retain the liquid crystal material in a specified space.

Figure 21:
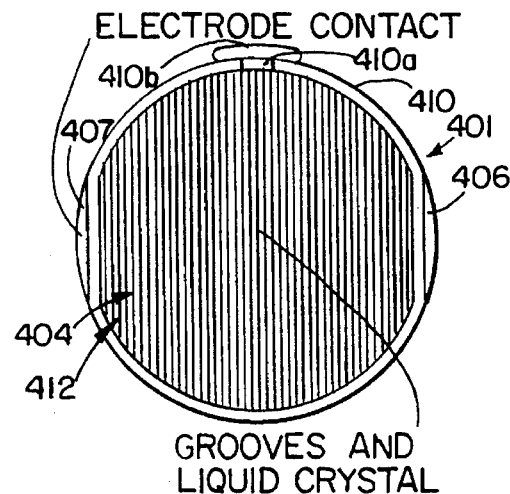
FIG. 21 is a top plan view of the grating based scattering polarizer of FIG. 20 wherein a significantly larger number of grooves containing liquid crystal material are shown.

An opening 410a (FIG. 21 ) is provided in the perimeter seal 410 to permit the delivery of liquid crystal material into the spaces 412. And end seal 410b may be secured to close the opening 410a after the liquid crystal material 411 has been installed in the spaces 411. Six grooves or troughs 412 forming the respective spaces 411 are shown in FIG. 20. However, a significantly larger number of grooves is depicted in FIG. 21. It will be appreciated that the actual number of grooves likely would be relatively large, and, therefore, the number shown in FIGS. 20 and 21 only are provided for schematic illustration of the invention. The actual number of grooves would be a function of the size of the polarizer 401, the depth of the grooves 412, the angles of the respective surfaces 413 forming the walls of the grooves, etc. An alignment layer 414 may be provided on the surfaces 413 to provide the desired alignment of liquid crystal structure or director, as was described above.

Exposed portions 406a, 407a of the respective electrodes are provided outside the boundary of the perimeter seal 410 to facilitate connection to an electrical source. That electrical source may be a voltage source of DC, AC, or mixed type of signal, as may be desired for the intended operation of the polarizer 401. The electrodes 406, 407, e.g., of ITO material or other material, may be deposited on respective surfaces of the plates 408, 409, the plates then being assembled or attached to the substrate 405 generally in the manner and arrangement illustrated in FIG. 20, and the plates preferably are secured directly to the substrate by or in addition to the perimeter seal 410. Although the electrodes 406, 407 are shown relatively thick in the illustration of FIG. 20 for convenience, it will be appreciated that the electrodes will be relatively thin to the extent that they preferably are transparent to light. The substrate 405 may be, for example a clear polymer, which preferably is isotropic, that is formed in one of the ways described above or may be some other clear material, clear meaning relative to light transmitting characteristics.

In an example of the polarizer 401, the plates 408, 409 are formed of fused quartz. The thickness of those plates, i.e., in the vertical dimension relative to the illustration in FIG. 20, is about 1 millimeter. The depth of a trough 412, for example, from the highest point 421 thereof to the lowest or most recessed point 422 thereof is about 8 microns. The angle between respective adjacent surfaces 413a, 413b forming respective sides or walls of the trough at the low point 422 of the trough 412 may be 40.5°. The space between adjacent high points 421 of the trough 412 is about 2 microns. The index of refraction of the clear polymer substrate 405 is 1.538. The index of refraction of the plates 408, 409 is about 1.518. The liquid crystal material 404 has an ordinary index of refraction $N_e$ that is about 1.530, i.e., the same as the index of refraction of the substrate 405, and an extraordinary index of refraction $N_e$ of about 1.814.

In operation of the polarizer 401 shown in FIG. 20 in the clear state, light 402, 403 will be transmitted through the polarizer without regard to the direction of polarization and, therefore, without refraction or scattering.

Figure 22:
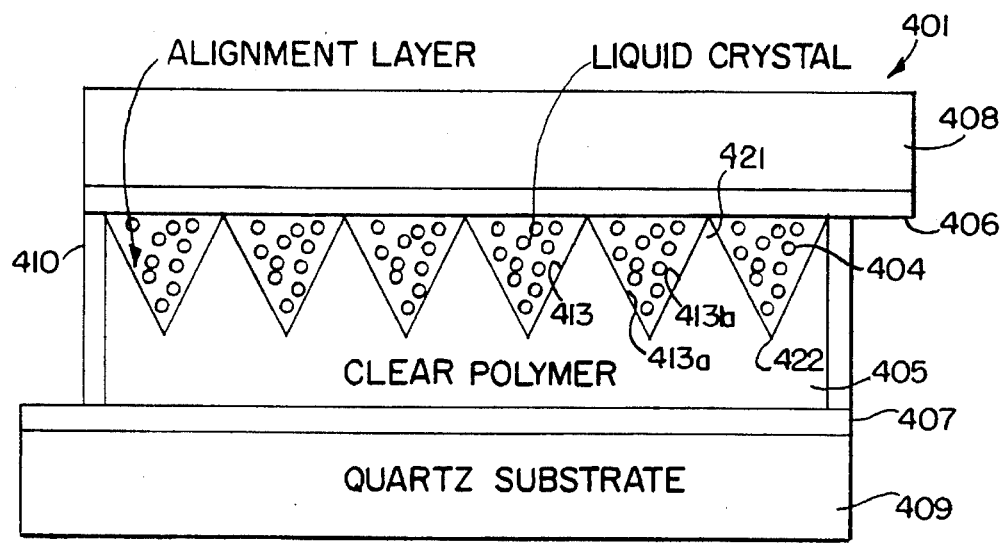
FIG. 22 is a schematic side elevation view of the grating based scattering polarizer of FIG. 20, but shown in the voltage off or polarizing state.
Figure 23:
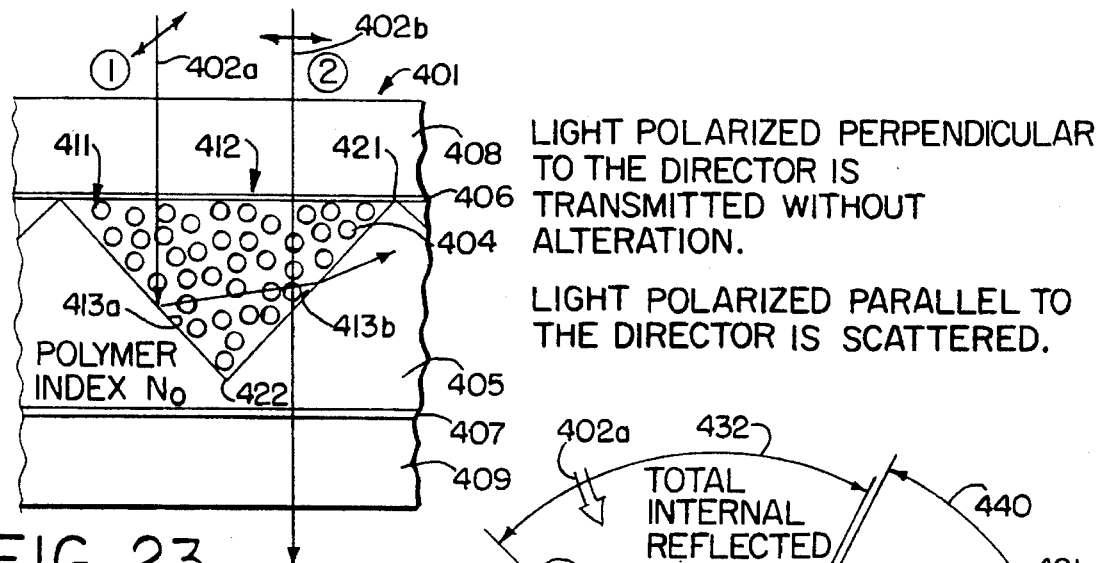
FIG. 23 is a schematic illustration of the light propagating properties of the polarizer of FIG. 22 in the polarizing state, depicting incident light that is polarized perpendicular to the liquid crystal director being transmitted without alteration in the transmission direction and light polarized parallel to the directors being scattered.

In FIGS. 22 and 23 the polarizer 401 is depicted in the polarizing state. In such state the input field is removed or is reduced sufficiently low as to allow the liquid crystal material 404 to realign so that it generally is parallel to the respective surfaces 413. Light ray 402a, which is polarized light vibrating in a direction that is parallel to the liquid crystal directors will be scattered. Specifically, as is shown in FIG. 23, light 402a is totally internally reflected at the surface 413a and is refracted at the surface 413b so as to be directed out of the field of view of the polarizer 401. However, light ray 402b represents incident polarized light that is vibrating in a direction perpendicular to the directors of the liquid crystal material. Light 402b is transmitted through the polarizer 401 without scattering.

Figure 24:
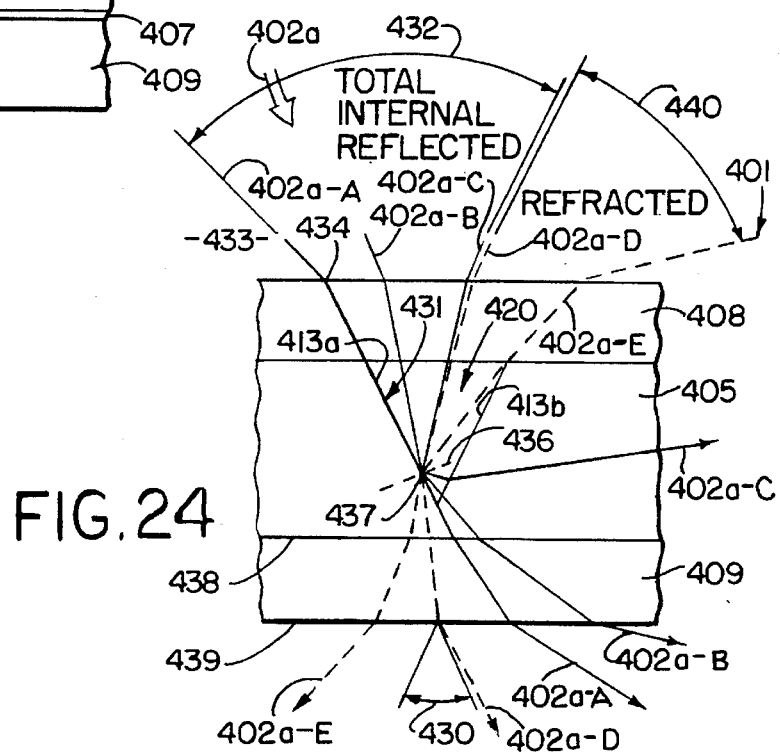
FIG. 24 is a schematic side elevation view of the grating based scattering polarizer in the polarizing state depicting the direction of propagation of light and the acceptance angle for the incident light.

The polarizer 401 has a relatively large acceptance angle for incident light as is seen in FIG. 24. The illustration of FIG. 24 is drawn with respect to a number of polarized light rays 402a vibrating in a direction that is parallel to the liquid crystal directors in the groove 412. The light rays 402a in FIG. 24 are shown relative to interaction or operation with the surface 413a at the left side of the groove 412. A similar depiction could be provided with respect to interaction or operation relative to the surface 413b, although for brevity such is not illustrated or described here in detail. In the illustration of FIG. 24 the liquid crystal material is oriented so as to provide for scattering of light 402a out of the field of view defined by an output acceptance angle 430 so that the light falling within the acceptance angle is plane polarized in a direction perpendicular to the direction of the liquid crystal directors and the light outside the acceptance angle 430 is not polarized in such specified plane. Thus, in the polarizer 401 depicted in FIG. 24, the liquid crystal material (not shown) in the grooves 412 is oriented in the manner depicted in FIG. 23, i.e., generally perpendicular to the transmission direction of the incident light and, in any event, arranged so that there will be a difference in some aspect of the index of refraction characteristic at the interface 431.

Relative to the surface 413a of the groove 412, incident light 402a falling within the input acceptance angle 432 will be totally internally reflected upon impinging on the interface 431. The angle 432 is a function of the relative indices of refraction of the medium 433 external of the polarizer 401 and the index of refraction of the plate 408 where light is refracted at the interfaces 434 and 435 and is directed almost parallel to the surface 413a such that the angle of the light ray 402a-A is slightly less than 90° with respect to the normal 436 drawn at the point of intersection 437 of the light ray 402a-A with the surface 413a. Refraction also occurs at interfaces 438 and 439. Light ray 402a-A exits the polarizer 401 near the bottom of FIG. 24 and is correspondingly labeled 402a-A.

A light ray 402a-B falling within the angle 432 also is totally internally reflected at the point of intersection 436 with surface 413a and exits the polarizer 401 at the bottom of FIG. 24 far out of the field of view or acceptance angle 430. Light ray 402a-C is totally internally reflected at the point of intersection 437 at the interface 431 and is refracted at the interface formed with the surface 413b; and light ray 402a-C tends to be directed somewhat horizontally and in any event far out of the acceptance angle 430. Incident light ray 402a-C forms the limit of the angle 432 with respect to which for total internal reflection of light incident on the surface 413a at the point 437 is totally internally reflected.

Angle 440 represents the angle within which incident light can impinge on the polarizer 401 relative to the surface 413a of the groove 420 and be refracted outside of the acceptance angle 430. Examples of two rays at the limits of the angle 440 are presented at 402a-D and 402a-E.

The actual input acceptance angle for the polarizer 401 to be operative to provide plane polarized light in the output acceptance angle 430 ordinarily would be larger than the sum of the acceptance angle 432 and the acceptance angle 440 because of the extension and overlap of the respective input acceptance angles for respective light rays drawn relative to the surface 413b.

In view of the foregoing, then, it will be appreciated that the present invention provides for a relatively large input acceptance angle for incident light to be received and in effect converted to plane polarized light provided in a specified output acceptance angle to an output field of view. That output field of view or output acceptance angle 430 may be a function of a further optical device or optical system with which the polarizer 401 is used.

Figure 25:
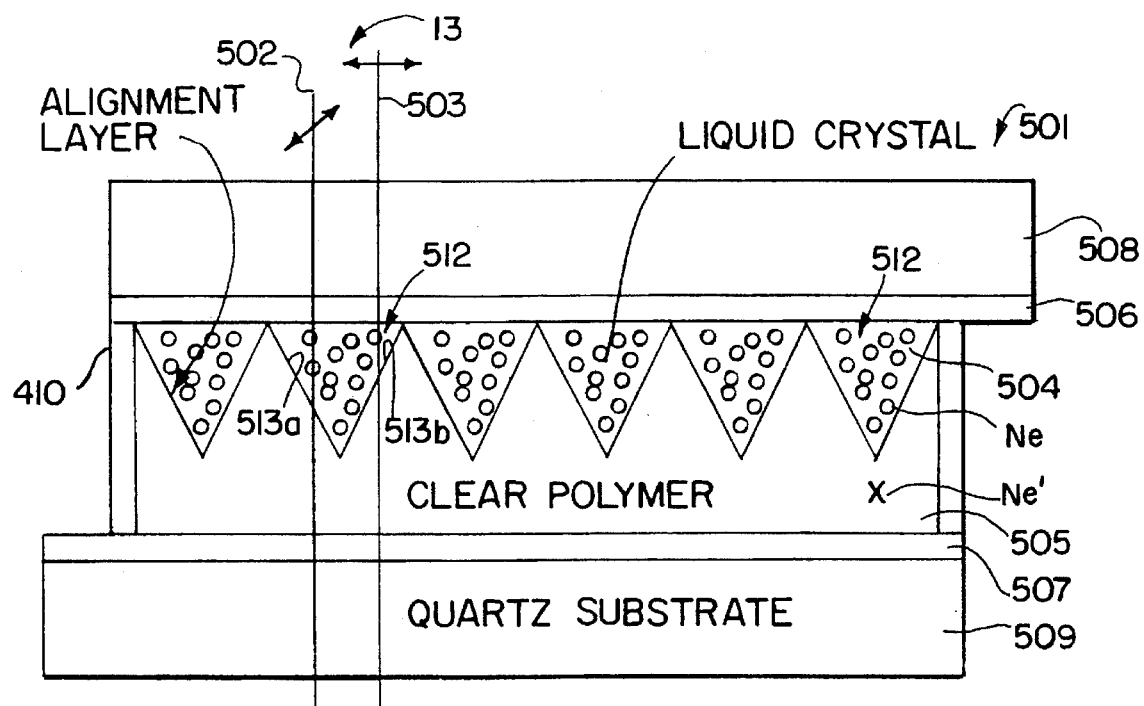
FIG. 25 is a schematic side elevation view of another embodiment of grating based scattering polarizer according to the invention in which the medium other than the liquid crystal material is birefringent, the polarizer being depicted in the voltage off or clear state.
Figure 26:
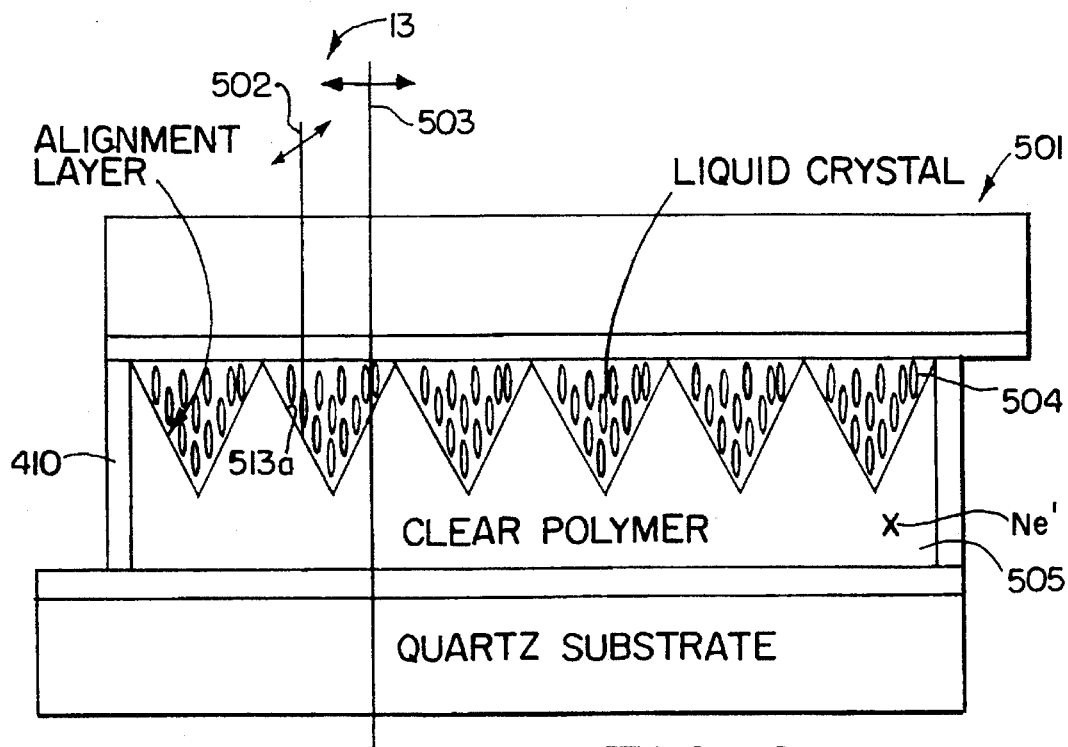
FIG. 26 is a schematic side elevation view of the polarizer of FIG. 25 in the voltage on or polarizing state.

Turning to FIGS. 25 and 26, an alternate embodiment of grating based scattering polarizer 501 is illustrated. The polarizer 501 is substantially the same as the polarizers 1, 401, and like parts relating to polarizer 401 are designated by like reference numerals but increased by one-hundred. A primary difference between the polarizer 501 and the polarizer 401 concerns the material of which the substrate 505 is made. Specifically, the substrate 505 is a birefringent material that has, for example, an ordinary index of refraction $N_o'$ and an extraordinary index of refraction $N_e'$ which effectively are different. This characteristic of the substrate 505 allows the polarizer 501 to be transparent or clear in the de-energized state or in any event the state in which the liquid crystal material is oriented such that the directors are perpendicular to one polarization direction of the incident light. Therefore, if the polarizer 501 uses nematic or operationally nematic liquid crystal material, in the absence of an applied input, such as an electric field, the polarizer 501 can be clear. However, in the presence of the prescribed input, the polarizer 501 would function to scatter one polarization direction of the incident light and to transmit the other polarization direction. This operation is opposite the operation of the polarizer 401 described above with respect to FIGS. 20–24, when the substrate 405 is an isotropic material.

The polarizer 501 in the orientation illustrated in FIG. 25, i.e., the de-energized state in which the liquid crystal material directors are generally parallel with the respective surfaces of the substrate 505, the light rays 502,503 of the incident light 13 respectively having polarization directions parallel to the liquid crystal directors and perpendicular to the liquid crystal directors will be transmitted without scattering. The polarizer 501 includes liquid crystal material located in spaces formed in the material 505 as aforesaid. The polarizer 501 also includes electrodes 506, 507, plates 508,509, seal 510, and troughs 412 as was described above with respect to FIGS. 20–24, for example.

The substrate 505 is made of a material that has an extraordinary index of refraction $N_e'$ that preferably is the same as the extraordinary index of refraction $N_e$ of the liquid crystal material 504. The substrate 505 also preferably has an ordinary index of refraction $N_o'$ that is the same as the ordinary index of refraction $N_o$ of the liquid crystal material 504. Furthermore, preferably the dispersion and the birefringence of the liquid crystal material 504 and the substrate 505 respectively are the same. Additionally, the axis of the liquid crystal material in which the extraordinary index of refraction would be experienced, i.e., a direction parallel to the liquid crystal directors, and the axis of the substrate 505 in which the extraordinary index of refraction thereof would be experienced by light propagating therethrough are parallel. In FIG. 25 such axis of the directors of the liquid crystal material 504 is into the plane of the paper as is represented by the various circles in the troughs 512. Also, the direction of such axis with respect to the substrate 505 is represented by the letter "x" at the fight hand portion of the substrate 505 as an exemplary representation of such direction also into the plane of the paper.

Plane polarized light 502 vibrating in a direction that is parallel to the directors of the liquid crystal material 504 and also parallel to the aforementioned axis of the substrate 505 will experience the extraordinary index of refraction $N_e$ of the liquid crystal material 504 and the extraordinary index of refraction $N_e'$ of the substrate 505. Since those indices of refraction are the same, there will be no difference in index of refraction at the interface with the surface 513a, and no refraction or total internal reflection will occur at that interface. Accordingly, light 502 will transmit through the polarizer 501 without scattering or refraction. Plane polarized light 503 is vibrating in a direction perpendicular to the directors of the liquid crystal material 504 and, thus, perpendicular to the axial direction represented by the letter "x" of the substrate 505. Light 503 will experience the ordinary index of refraction $N_o$ of the liquid crystal material 504 and the ordinary index of refraction of the substrate 505; since those ordinary indices of refraction are the same, there will not be any refraction or reflection of light 503 at the interface with the surface 513b of the trough 512.

In FIG. 26 a field input has been applied to the polarizer 501 causing alignment of the liquid crystal material 504 parallel to the field. Incident plane polarized light 502 which is vibrating in a direction parallel to the extraordinary index of refraction direction "x" of the substrate 505 experiences the ordinary index of refraction $N_o$ in the liquid crystal material 504 and the extraordinary index of refraction $N_e'$ in the substrate 505. Since the ordinary index of refraction $N_o$ of the liquid crystal material and the extraordinary index of refraction $N_e'$ of the substrate 505 are different, refraction and/or scattering of light will occur at the interface 513a. Such scattering or total internal reflection is not depicted in FIG. 26, as whether scattering or reflection occurs and the angle(s) thereof will be a function of indices of refraction, angles of incidence, etc. which are described and illustrated in greater detail with reference to FIGS. 20–24 above, for example. However, as to plane polarized light 503, which is vibrating in a direction perpendicular to the extraordinary index of refraction direction "x" of the substrate 505, such light 503 will experience the ordinary index of retraction $N_o$ in the liquid crystal material 504 and the ordinary index of refraction $N_o'$ in the substrate 505. Therefore, light 503 will transmit through the polarizer 501 without scattering or refraction. Thus, for the incident light 13 directed to the polarizer 501 arranged or driven in the manner shown in FIG. 26, light having a polarization direction represented by light 502 Will be removed from light having a polarization direction as light 503, and, therefore, the output light 15 will be plane polarized in the vibration direction of light 503 at least within a prescribed output acceptance angle or viewing direction.

Exemplary liquid crystal material for use in the various polarizers described above also may be used in the polarizer 501. The substrate 505 may be formed of a liquid crystal polymer having index of refraction, birefringence and dispersion characteristics that are the same as or substantially the same as those of the liquid crystal material 504. An exemplary liquid crystal polymer having such characteristics may be a liquid crystal polymer formed of a poly(siloxane) material used as the "backbone" of the liquid crystal polymer, and having side chains that are monomers which are similar in molecular structure to and optical characteristics as the liquid crystal material 504 used as the switchable medium of the polarizer 501. Such side chain monomers for the liquid crystal polymer, therefore, will provide the substrate 505 with index of refraction characteristics that are the same or substantially the same as those of the liquid crystal material 504 and also will provide for the same or substantially the same dispersion and birefringence characteristics as those of the liquid crystal material. Preferably, the side chain monomers are the same liquid crystal material as the liquid crystal material 504. Other types of material may be used for the substrate 505 provided the desired functional characteristics described herein are obtained.

Comparing the polarizer 401 with the polarizer 501, simply summarized, then, the polarizer 401 polarizes light or acts as a polarizer in the absence of an applied input, whereas the polarizer 501 polarizes light or acts as a polarizer in the presence of an applied input. Both polarizers tend to transmit substantially all incident light when in the mode opposite that of when it is polarizing light. The polarizer 401 transmits light without regard to polarization direction when the liquid crystal material is aligned in a direction parallel to an applied field so that the ordinary index of refraction of the liquid crystal material and the index of refraction of the substrate 405, which is isotropic, are the same. Such alignment and operation occur in the presence of an electric field, for example, or when the liquid crystal material has been aligned in response to application to an electric field, e.g., using smectic liquid crystal material that retains its orientation after the field has been removed. The polarizer 401 scatters light when the liquid crystal material is oriented such that the extraordinary index of refraction of the liquid crystal material 404 is experienced by at least some of the light which is refracted or reflected due to a difference between the liquid crystal extraordinary index of refraction and the index of refraction of the isotropic substrate 405. The latter liquid crystal alignment or operation occurs when a field is removed. In contrast, the polarizer 501 scatters one polarizer direction of incident light when the liquid crystal material 504 is aligned so that the incident light experiences only the ordinary index of refraction, which is different from the extraordinary index of refraction of the substrate 505. Such operation occurs, for example, in response to the application of a prescribed input, such as an electric field. However, upon removal of the field or otherwise changing of alignment of the liquid crystal material 504 to that shown in FIG. 25, light will be transmitted through the polarizer 501 without regard to the direction of polarization.

While it will be appreciated that operation of the invention primarily takes advantage of refraction and/or reflection of polarization components of the incident light to obtain separation, Brewster's Law also may be used in the invention to enhance polarization of the transmitted light in the output direction.

It will be appreciated that some of the above description relates to operation of the respective polarizers relative to incident light that is normal to the light receiving surface, e.g., surface 41 (FIG. 1) of the polarizer. However, similar operation will occur even if the incident light is received at a number of angles other than normal to the input surface, as will be evident from the above description with respect to FIG. 24, for example and FIG. 10, vis-a-vis light 60 and 80, for example.

It will be appreciated from the above description that the invention provides for selectively polarizing light or polarizing light on demand and the polarized light may be used in a variety of optical devices and for a variety of purposes as will become evident to those having ordinary skill in the art. The invention provides a device for polarizing light, a method of making that device, and a method for polarizing light. The invention also relates to uses of such device to provide optical protection, light shutter, and display functions, e.g., in a direct display, projection display, etc., and the invention also may be used for other functions.

I claim:

1. A polarizer, comprising
liquid crystal material, and
surface means for cooperating with said liquid crystal material to control polarization of light on said polarizer by refraction or total internal reflection of one polarization component of said light while transmitting the other polarization component substantially without refraction or total internal reflection, said surface means including plural grooves in cooperative relationship with said liquid crystal material.

2. The polarizer of claim 1, said liquid crystal material being birefringent.

3. The polarizer of claim 1, wherein said reflection or total internal reflection is substantially without diffraction.

4. The polarizer of claim 1, said surface means comprising optically transmissive material.

5. The polarizer of claim 1, said liquid crystal material being in the absence of pleochroic dye.

6. The polarizer of claim 1, said surface means having an index of refraction, and wherein the ordinary index of refraction of said liquid crystal material is substantially the same as the index of refraction of said surface means and the extraordinary index of refraction of said liquid crystal material is larger than the index of refraction of said surface means.

7. The polarizer of claim 1, said surface means comprising means to align at least some of said liquid crystal material in a direction generally parallel to said surface means.

8. The polarizer of claim 7, said means to align comprising means to align at least some of said liquid crystal material in a direction generally parallel to respective grooves.

9. The polarizer of claim 8, said surface means being formed by the process of stamped morphology.

10. The polarizer of claim 7, said means to align comprising a rubbed surface of said surface means.

11. The polarizer of claim 7, said means to align comprising an evaporated coating on said surface means.

12. A polarizer, comprising
liquid crystal material, and
surface means for cooperating with said liquid crystal material to control polarization of light which is incident on said polarizer by at least one of refraction and total internal reflection of one polarization component of said light while transmitting the other polarization component substantially without refraction or total internal reflection, said surface means including plural grooves in cooperative relationship with said liquid crystal material,
said surface means comprising means to align at least some of said liquid crystal material in a direction generally parallel to said surface means,
said liquid crystal material having a tilt angle relative to said surface means within a range of about 1° to about 30°.

13. A polarizer, comprising
liquid crystal material, and
surface means for cooperating with said liquid crystal material to control polarization of light which is incident on said polarizer by at least one of refraction and total internal reflection of one polarization component of said light while transmitting the other polarization component substantially without refraction or total internal reflection, said surface means including plural grooves in cooperative relationship with said liquid crystal material,
said surface means comprising a substrate, plural raised surfaces on said substrate forming acute angles greater than 0° relative to the direction of incident light, respective pairs of at least some of said surfaces defining a respective groove therebetween, a cover facing the apices of respective pairs of surfaces, said liquid crystal material being located in the space defined between respective pairs of surfaces and said cover.

14. The polarizer of claim 13, said surface means having an index of refraction, and wherein the ordinary index of refraction of said liquid crystal material is substantially the same as the index of refraction of said surface means and the extraordinary index of refraction of said liquid crystal material is larger than the index of refraction of said surface means, said liquid crystal material being aligned generally parallel to said surface means, cover means and grooves.

15. The polarizer of claim 14, said surface means and cover comprising at least one of a rubbed surface, an evaporated coating on said surface means and being formed by the process of stamped morphology to align said liquid crystal material with respect to said surface means.

16. The polarizer of claim 15, said liquid crystal material being birefringent, operationally nematic, and having positive dielectric anisotropy.

17. The polarizer of claim 15, wherein the direction of alignment at said cover is generally parallel and pointing the same as the direction of alignment at said surfaces.

18. The polarizer of claim 15, said liquid crystal material having a tilt angle relative to said surface means within a range of about 1° to about 30°.

19. A polarizer, comprising liquid crystal material, and surface means for cooperating with said liquid crystal material to control polarization of light which is incident on said polarizer by at least one of refraction and total internal reflection of one polarization component of said light while transmitting the other polarization component substantially without refraction or total internal reflection, said surface means including plural grooves in cooperative relationship with said liquid crystal material, said liquid crystal material being operationally nematic.

20. A polarizer, comprising liquid crystal material, and surface means for cooperating with said liquid crystal material to control polarization of light which is incident on said polarizer by at least one of refraction and total internal reflection of one polarization component of said light while transmitting the other polarization component substantially without refraction or total internal reflection, said surface means including plural grooves in cooperative relationship with said liquid crystal material, said surface means comprising plural flat surfaces oriented at an acute angle greater than 0° with respect to the direction of incident light.

21. The polarizer of claim 20, further comprising a substrate having a generally plane face, said surface means being on one surface of said substrate opposite said plane face, a cover cooperative with said surface means at least partly to define a space for said liquid crystal material.

22. The polarizer of claim 21, said cover comprising generally planar optically transmissive material having opposite generally planar faces positioned generally in parallel with said plane face of said substrate.

23. A polarizer, comprising liquid crystal material, and surface means for cooperating with said liquid crystal material to control polarization of light which is incident on said polarizer by at least one of refraction and total internal reflection of one polarization component of said light while transmitting the other polarization component substantially without refraction or total internal reflection, said surface means including plural grooves in cooperative relationship with said liquid crystal material, said liquid crystal material having positive dielectric anisotropy.

24. A polarizer, comprising liquid crystal material, and surface means for cooperating with said liquid crystal material to control polarization of light which is incident on said polarizer by at least one of refraction and total internal reflection of one polarization component of said light while transmitting the other polarization component substantially without refraction or total internal reflection, said surface means including plural grooves in cooperative relationship with said liquid crystal material, said surface means comprising epoxy.

25. A polarizer, comprising liquid crystal material, and surface means for cooperating with said liquid crystal material to control polarization of light which is incident on said polarizer by at least one of refraction and total internal reflection of one polarization component of said light while transmitting the other polarization component substantially without refraction or total internal reflection, said surface means including plural grooves in cooperative relationship with said liquid crystal material, said surface means comprising a polymer.

26. A polarizer, comprising liquid crystal material, and surface means for cooperating with said liquid crystal material to control polarization of light which is incident on said polarizer by at least one of refraction and total internal reflection of one polarization component of said light while transmitting the other polarization component substantially without refraction or total internal reflection, said surface means including plural grooves in cooperative relationship with said liquid crystal material, said surface means comprising a ultraviolet radiation curable material.

27. A polarizer, comprising liquid crystal material, and surface means for cooperating with said liquid crystal material to control polarization of light which is incident on said polarizer by at least one of refraction and total internal reflection of one polarization component of said light while transmitting the other polarization component substantially without refraction or total internal reflection, said surface means including plural grooves in cooperative relationship with said liquid crystal material, further comprising means for applying a field to said liquid crystal material to orient said liquid crystal material relative to said field.

28. The polarizer of claim 27, said liquid crystal material having an extraordinary index of refraction different from the index of refraction of said surface means and an ordinary index of refraction, and wherein the difference between the ordinary index of refraction and the index of refraction of said surface means is less than the difference between the extraordinary index of refraction and the index of refraction of said surface means.

29. The polarizer of claim 28, said means for applying a field comprising a source of electric energy, and electrode means for receiving electrical energy and applying an electric field across at least some of said liquid crystal material.

30. The polarizer of claim 28, said surface means comprising a substrate, plural raised surfaces on said substrate forming acute angles greater than 0° relative to the direction of incident light, respective pairs of at least some of said surfaces defining a respective groove therebetween, a cover facing the apices of respective pairs of surfaces, said liquid crystal material being located in the space defined between respective pairs of surfaces and said cover, said liquid crystal material being aligned generally parallel to said surface means, cover means and grooves absent application of said field.

31. A polarizer, comprising liquid crystal material, and surface means for cooperating with said liquid crystal material to control polarization of light which is incident on said polarizer by at least one of refraction and total internal reflection of one polarization component of said light while transmitting the other polarization component substantially in said direction without refraction or total internal reflection, said surface means including plural grooves in cooperative relationship with said liquid crystal material, and said surface means being birefringent.

32. The polarizer of claim 31, said liquid crystal material also being birefringent;

the ordinary index of refraction of said liquid crystal material and the ordinary index of refraction of said surface means being matched and oriented so that light propagating through said liquid crystal material and said surface means can experience ordinary index of refraction in both said liquid crystal material and said surface means; and the extraordinary index of refraction of said liquid crystal material and the extraordinary index of refraction of said surface means being matched and oriented so that light propagating through said liquid crystal material and said surface means can experience extraordinary index of refraction in both said liquid crystal material and said surface means.

33. A polarizer, comprising birefringent liquid crystal material having ordinary and extraordinary indices of refraction, means for cooperating optically with said liquid crystal material, said means for cooperating including plural grooves, the difference between said respective indices of refraction of said liquid crystal material and the index of refraction of said means for cooperating being respectively relatively minimal and relatively larger, and said liquid crystal material being alignable relative to said means for cooperating to transmit one polarization component of incident light substantially without affecting it and at least one of to refract and to cause total internal reflection of the other polarization component thereby to separate said polarization components.

34. A polarizer, comprising first medium and a second medium, said first medium having an index of refraction and plural grooves, said second medium being birefringent and the difference between the index of refraction of said first medium and the respective indices of refraction of said second medium being respectively relatively small and relatively large, and said media being oriented relative to each other and positionable with respect to incident light to transmit one polarization component substantially without affecting it while separating therefrom the other polarization component substantially by way of at least one of refraction and reflection without substantial diffraction.

35. A controllable polarizer, comprising birefringent liquid crystal material, and means for cooperating with said liquid crystal material to transmit one polarization component of incident light substantially without affecting it and controllably to separate the other polarization component of incident light substantially by reflection or refraction, said means for cooperating including plural grooves.

36. A method of polarizing light, comprising aligning liquid crystal relative to a surface having plural grooves to provide a difference in index of refraction therebetween with respect to one polarization component of incident light to cause at least one of refraction and reflection of such light substantially without diffraction and less difference or a match of index of refraction for the other polarization component of incident light to transmit said other polarization component substantially without affect, thereby to separate said other polarization component from said one polarization component.

37. A method of making a polarizer, comprising providing a first medium having grooves forming plural surfaces for refracting, reflecting or transmitting incident light, placing a birefringent liquid crystal material in position with respect to said surfaces to cooperate with said surfaces controllably to refract or to reflect one component of incident light and to transmit the other component of incident light substantially without refraction or reflection.

38. A polarizer, comprising liquid crystal material, and surface means for cooperating with said liquid crystal material to control polarization of light by at least one of refraction and total internal reflection of one polarization component of light while transmitting the other polarization component substantially without refraction or total internal reflection, said surface means comprising a substrate, plural raised surfaces on said substrate forming acute angles greater than 0° relative to the direction of incident light, respective pairs of at least some of said surfaces defining a respective groove therebetween, a cover facing the apices of respective pairs of surfaces, said liquid crystal material being located in the space defined between respective pairs of surfaces and said cover, said surface means having an index of refraction, and wherein the ordinary index of refraction of said liquid crystal material is substantially the same as the index of refraction of said surface means and the extraordinary index of refraction of said liquid crystal material is larger than the index of refraction of said surface means, said liquid crystal material being aligned generally parallel to said surface means, cover means and grooves.

said surface means and cover comprising at least one of a rubbed surface, an evaporated coating on said surface means and being formed by the process of stamped morphology to align said liquid crystal material with respect to said surface means, and wherein the direction of alignment at said cover is generally parallel and pointing opposite the direction of alignment at said surfaces.

* * * * *